US008761162B2

(12) United States Patent
Walker et al.

(10) Patent No.: US 8,761,162 B2
(45) Date of Patent: Jun. 24, 2014

(54) SYSTEMS AND METHODS FOR APPLICATIONS USING CHANNEL SWITCH FRAMES

(75) Inventors: Gordon Kent Walker, Poway, CA (US); Vijayalakshmi R. Raveendran, San Diego, CA (US); Serafim S. Loukas, Jr., Carlsbad, CA (US); Seyfullah Halit Oguz, San Diego, CA (US); Fang Shi, San Diego, CA (US); Sitaraman Ganapathy Subramania, San Diego, CA (US); Phanikumar Bhamidipati, San Diego, CA (US); James T. Determan, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 11/941,014

(22) Filed: Nov. 15, 2007

(65) Prior Publication Data

US 2008/0127258 A1 May 29, 2008

Related U.S. Application Data

(60) Provisional application No. 60/866,018, filed on Nov. 15, 2006.

(51) Int. Cl.
H04L 12/56 (2011.01)
H04N 5/45 (2011.01)

(52) U.S. Cl.
USPC .............................. 370/389; 725/39; 725/44

(58) Field of Classification Search
USPC ............. 370/352, 389, 230.1, 235, 395.21, 370/395.43, 465; 725/44, 39, 50, 52, 113; 348/725; 375/240.12, 240.24
See application file for complete search history.

(56) References Cited

U.S. PATENT DOCUMENTS 5,241,563 A 8/1993 Paik et al.
5,875,199 A 2/1999 Luthi
(Continued)

FOREIGN PATENT DOCUMENTS

CN 1278138 12/2000
CN 1478355 2/2004
(Continued)

OTHER PUBLICATIONS

Casoulat, R, et al., "On the Usage of Video in Laser," Video Standards and Drafts, Apr. 29, 2005, pp. 1-7.
(Continued)

Primary Examiner — Asad Nawaz
Assistant Examiner — Saba Tsegaye
(74) Attorney, Agent, or Firm — Fulbright & Jaworski LLP

(57) ABSTRACT

Techniques for video encoding and decoding a common guide media logic channel (MLC) to enable fast acquisition and re/synchronization of the video stream while preserving compression efficiency are provided. Systems and methods to process multimedia data using channel switch frames are presented. The system comprises an encoder operative to generate a common guide media logical channel (MLC) of a plurality of channel switch frames (CSFs), each respective active channel having one or more CSFs in the guide MLC. The decoder in the system is operative to decode a set of the plurality of CSFs from the guide MLC. The decoder simultaneously displays programming content of the decoded set of the plurality of CSFs on a display and automatically switches to a primary bitstream of an active channel associated with a selected one displayed CSF.

52 Claims, 23 Drawing Sheets

(56) References Cited

U.S. PATENT DOCUMENTS

| | | | |
|---|---|---|---|
| 6,057,884 A * | 5/2000 | Chen et al. | 375/240.16 |
| 6,370,666 B1 | 4/2002 | Lou et al. | |
| 6,480,541 B1 | 11/2002 | Girod et al. | |
| 6,535,240 B2 | 3/2003 | Yang et al. | |
| 6,611,561 B1 | 8/2003 | Hannuksela et al. | |
| 7,020,823 B2 | 3/2006 | Bushmitch et al. | |
| 7,031,348 B1 | 4/2006 | Gazit | |
| 7,072,366 B2 | 7/2006 | Parkkinen et al. | |
| 7,075,986 B2 | 7/2006 | Girod | |
| 7,085,324 B2 | 8/2006 | Choi et al. | |
| 7,116,714 B2 | 10/2006 | Hannuksela | |
| 7,369,610 B2 | 5/2008 | Xu et al. | |
| 7,428,639 B2 * | 9/2008 | Demos | 713/176 |
| 7,552,227 B2 | 6/2009 | Wang | |
| 7,606,314 B2 | 10/2009 | Coleman et al. | |
| 8,135,852 B2 | 3/2012 | Nilsson et al. | |
| 8,477,840 B2 | 7/2013 | Yin et al. | |
| 2003/0014752 A1 | 1/2003 | Zaslavsky et al. | |
| 2004/0066854 A1 | 4/2004 | Hannuksela | |
| 2004/0179139 A1 | 9/2004 | Choi et al. | |
| 2004/0181811 A1 | 9/2004 | Rakib | |
| 2004/0213473 A1 | 10/2004 | Ohira | |
| 2004/0218816 A1 | 11/2004 | Hannuksela | |
| 2004/0228535 A1 * | 11/2004 | Honda et al. | 382/233 |
| 2004/0243913 A1 | 12/2004 | Budge et al. | |
| 2004/0244037 A1 | 12/2004 | Yamaguchi et al. | |
| 2005/0163211 A1 * | 7/2005 | Shanableh | 375/240.1 |
| 2005/0175091 A1 | 8/2005 | Puri et al. | |
| 2005/0185541 A1 | 8/2005 | Neuman | |
| 2005/0185795 A1 * | 8/2005 | Song et al. | 380/218 |
| 2005/0200757 A1 | 9/2005 | Pica et al. | |
| 2005/0213668 A1 | 9/2005 | Iwabuchi et al. | |
| 2006/0018377 A1 | 1/2006 | Kadono | |
| 2006/0018379 A1 * | 1/2006 | Cooper | 375/240.12 |
| 2006/0120378 A1 | 6/2006 | Usuki et al. | |
| 2006/0120448 A1 * | 6/2006 | Han et al. | 375/240.2 |
| 2006/0146143 A1 | 7/2006 | Xin et al. | |
| 2006/0146934 A1 * | 7/2006 | Caglar et al. | 375/240.12 |
| 2006/0239299 A1 | 10/2006 | Scheid et al. | |
| 2007/0071100 A1 | 3/2007 | Shi et al. | |
| 2007/0071105 A1 | 3/2007 | Tian et al. | |
| 2007/0073779 A1 | 3/2007 | Walker et al. | |
| 2007/0076796 A1 | 4/2007 | Shi et al. | |
| 2007/0083578 A1 | 4/2007 | Chen et al. | |
| 2007/0088971 A1 | 4/2007 | Walker et al. | |
| 2007/0101378 A1 * | 5/2007 | Jacobs | 725/90 |
| 2007/0110105 A1 | 5/2007 | Usuki et al. | |
| 2007/0153914 A1 | 7/2007 | Hannuksela et al. | |
| 2007/0157248 A1 * | 7/2007 | Ellis | 725/47 |
| 2007/0288959 A1 * | 12/2007 | Istvan et al. | 725/39 |
| 2008/0022335 A1 * | 1/2008 | Yousef | 725/100 |
| 2008/0170564 A1 | 7/2008 | Shi et al. | |
| 2008/0196061 A1 * | 8/2008 | Boyce | 725/38 |
| 2009/0222856 A1 * | 9/2009 | Kim et al. | 725/39 |
| 2009/0245393 A1 | 10/2009 | Stein et al. | |
| 2010/0021143 A1 | 1/2010 | Toma et al. | |
| 2010/0153999 A1 * | 6/2010 | Yates | 725/39 |
| 2011/0194842 A1 * | 8/2011 | Krakirian | 386/297 |
| 2012/0294360 A1 | 11/2012 | Walker et al. | |

FOREIGN PATENT DOCUMENTS

| | | | |
|---|---|---|---|
| CN | 1674674 A | | 9/2005 |
| CN | 100337480 | | 9/2005 |
| CN | 1830164 | | 9/2006 |
| EP | 0966162 A1 | | 12/1999 |
| EP | 17156580 | | 10/2006 |
| EP | 1941738 | | 12/2010 |
| FR | EP1061737 | * | 12/2000 |
| JP | 8307786 A | | 11/1996 |
| JP | 2004507178 T | | 3/2004 |
| JP | 2004289808 A | | 10/2004 |
| JP | 2004350263 A | | 12/2004 |
| JP | 2006505024 A | | 2/2006 |
| JP | 2006527975 A | | 12/2006 |
| KR | 20040074365 A | | 8/2004 |
| KR | 20040074635 | | 8/2004 |
| KR | 2006113765 | | 2/2006 |
| KR | 20060015757 A | | 2/2006 |
| KR | 20060024416 | | 3/2006 |
| KR | 20060087966 A | | 8/2006 |
| RU | 2201654 | | 3/2003 |
| RU | 2328086 C2 | | 6/2008 |
| WO | WO9216071 | | 9/1992 |
| WO | WO0167777 | | 9/2001 |
| WO | WO0215589 A1 | | 2/2002 |
| WO | 03073753 | | 9/2003 |
| WO | WO03098475 A1 | | 11/2003 |
| WO | WO2004114667 A1 | | 12/2004 |
| WO | WO2004114668 A1 | | 12/2004 |
| WO | 2005043783 | | 5/2005 |
| WO | 2005067191 | | 7/2005 |
| WO | 2005076503 | | 8/2005 |
| WO | WO2005106875 A1 | | 11/2005 |
| WO | WO2005112465 A1 | | 11/2005 |
| WO | 2006104519 | | 5/2006 |
| WO | WO2007038726 A2 | | 4/2007 |
| WO | WO2007042916 | | 4/2007 |

OTHER PUBLICATIONS

Bernd Girod, "The information theoretical significance of spatial and temporal masking in video signals," SPIE vol. 1077, Human vision, visual processing, and digital display, pp. 178-187 (1989).

Jennehag U et al., "Increasing bandwidth utilization in next generation iptv networks," Image Processing, 2004. ICIP '04. 2004 International Conference on Singapore Oct. 24-27, 2004. Piscataway, NJ, USA, IEEE, Oct. 24, 2004, pp. 2075-2078.

Bormans J et al., "Video Coding with H.264/AVC: tools, performance and complexity," IEEE Circuits and Systems Magazine, IEEE Service Center, New York, NY, US, vol. 4, No. 1, Jan. 2004, pp. 7-28.

Huifang Sun et al., "Error Resilience Video Transcoding for Wireless Communications," IEEE Wireless Communications, IEEE Service Center, Piscataway, NJ, US, vol. 12, No. 4, Aug. 2005, pp. 14-21.

Faerber N et al: "Robust H.263 compatible video transmission for mobile access to video servers" Proceeding of the International Conference on Image Processing. ICIP 1997. Oct. 26-29, 1997, vol. 2, Oct. 26, 1997, pp. 73-76, XP002171169.

International Search Report and Written Opinion—PCT/US/2007/084885, International Search Authority—European Patent Office—Dec. 10, 2008.

ITU-T H.264, Series H: Audiovisual and Multimedia System Infrastructure of audiovisual services, Coding of moving video, "Advanced video coding for generic audivisual services," Nov. 2007: 7.3.5.3 Residual Data Syntax; and 9.2 CALVLC parsing process.

Karczewicz M et al.: "The SP- and Si-frame design for H.264/AVC," IEEE Transactions on Circuits and Systems for Video Technology, Jul. 2003, pp. 637-644, vol. 13, No. 7, XP011099256, ISSN: 1051-8215.

TIA-1099 Standard "Forward Link Only Air Interface Specificaiton for Terrestrial Mobile Multimedia Multicast" pp. 1-341, Mar. 2007.

Wiegand T: "H.264/AVC Video Coding Standard", Berlin, Germany, May 2003.

Jan Richardson, H.264 and MPEG-4 video coding—next-generation standards, Moscow, Tehnosfera, 2005, pp. 186-197, 220-224.

Taiwanese Search report—095135825—TIPO—Aug. 19, 2010.

European Search Report—EP10181358, Search Authority—Munich Patent Office, Jan. 25, 2011.

Translation of Office Action in Japan application 2008-533617 corresponding to U.S. Appl. No. 11/527,306, citing JP2004350263 and JP2004507178 dated Feb. 1, 2011.

* cited by examiner

SYSTEMS AND METHODS FOR APPLICATIONS USING CHANNEL SWITCH FRAMES

CROSS-REFERENCE TO RELATED APPLICATIONS

The present Application for Patent claims priority benefit of commonly-assigned Provisional Application Ser. No. 60/866,018 entitled "SYSTEMS AND METHODS FOR APPLICATIONS USING CHANNEL SWITCH FRAMES," filed Nov. 15, 2006. This provisional patent application is hereby expressly incorporated by reference herein.

This application further claims priority benefit of the commonly-assigned U.S. patent application Ser. Nos. 11/527,306, filed on Sep. 25, 2006, and 11/528,303, filed on Sep. 26, 2006, as well as U.S. Provisional Patent Application No. 60/865,822, filed on Nov. 14, 2006.

BACKGROUND

1. Field

The disclosure is directed to multimedia signal processing and, more particularly, to techniques for encoding and decoding, such as a common guide media logical channel (MLC), to enable fast acquisition and re/synchronization of the video stream while preserving compression efficiency.

2. Background

Multimedia processing systems, such as video encoders, may encode multimedia data using encoding methods based on international standards such as Moving Picture Experts Group (MPEG)-1, -2 and -4 standards, the International Telecommunication Union (ITU)-T H.263 standard, and the ITU-T H.264 standard and its counterpart, ISO/IEC MPEG-4, Part 10, i.e., Advanced Video Coding (AVC), each of which is fully incorporated herein by reference for all purposes. Such encoding methods generally are directed to compressing the multimedia data for transmission and/or storage. Compression can be broadly thought of as the process of removing redundancy from the multimedia data.

A video signal may be described in terms of a sequence of pictures, which include frames (an entire picture), or fields (e.g., an interlaced video stream comprises fields of alternating odd or even lines of a picture). As used herein, the term "frame" refers to a picture, a frame or a field. Video encoding methods compress video signals by using lossless or lossy compression algorithms to compress each frame. Intra-frame coding (also referred to herein as intra-coding) refers to encoding a frame using only that frame. Inter-frame coding (also referred to herein as inter-coding) refers to encoding a frame based on other, "reference," frames. For example, video signals often exhibit temporal redundancy in which frames near each other in the temporal sequence of frames have at least portions that are match or at least partially match each other.

Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, which may include 4×4 subblocks, and so forth. As used herein, the term "block" refers to either a macroblock or a subblock.

Encoders take advantage of temporal redundancy between sequential frames using inter-coding motion compensation based algorithms. Motion compensation algorithms identify portions of one or more reference frames that at least partially match a block. The block may be shifted in the frame relative to the matching portion of the reference frame(s). This shift is characterized by one or more motion vector(s). Any differences between the block and partially matching portion of the reference frame(s) may be characterized in terms of one or more residual(s). The encoder may encode a frame as data that comprises one or more of the motion vectors and residuals for a particular partitioning of the frame. A particular partition of blocks for encoding a frame may be selected by approximately minimizing a cost function that, for example, balances encoding size with distortion, or perceived distortion, to the content of the frame resulting from an encoding.

Inter-coding enables more compression efficiency than intra-coding. However, inter-coding can create problems when reference data (e.g., reference frames or reference fields) are lost due to channel errors, and the like. In addition to loss of reference data due to errors, reference data may also be unavailable due to initial acquisition or reacquisition of the video signal at an inter-coded frame. In these cases, decoding of inter-coded data may not be possible or may result in undesired errors and error propagation. These scenarios can result in a loss of synchronization of the video stream.

An independently decodable intra-coded frame is the most common form of frame that enables re/synchronization of the video signal. The MPEG-x and H.26x standards use what is known as a group of pictures (GOP) which comprises an intra-coded frame (also called an I-frame) and temporally predicted P-frames or bi-directionally predicted B frames that reference the I-frame and/or other P and/or B frames within the GOP. Longer GOPs are desirable for the increased compression rates, but shorter GOPs allow for quicker acquisition and re/synchronization. Increasing the number of I-frames will permit quicker acquisition and re/synchronization, but at the expense of lower compression.

Therefore, what is needed are techniques for video encoding and decoding, such as a common media logic channel guide, to enable fast acquisition and re/synchronization of the video stream while preserving compression efficiency.

SUMMARY

Techniques for video encoding and decoding, such as a common guide media logic channel, to enable fast acquisition and re/synchronization of the video stream while preserving compression efficiency are provided. In one aspect, a system comprising an encoder operative to generate a common guide media logical channel (MLC) of a plurality of channel switch frames (CSFs), each respective one active channel associated with a respected one or more CSFs is provided. The system also includes a decoder operative to decode a set of the plurality of CSFs and simultaneously display programming content of the decoded set of the plurality of CSFs, on a display and automatically switch to a primary bitstream of an active channel associated with a selected one displayed CSF.

In another aspect, a device comprising a decoder operative to decode programming content of a set of CSFs from a plurality of CSFs in a common guide media logical channel (MLC) is provided. The decoder is further operative to simultaneously display on a display screen programming content of the decoded set of CSFs, and automatically switch to a primary bitstream of an active channel associated with a selected one displayed CSF. The device further includes a memory coupled to the decoder.

In a still further aspect, an integrated circuit comprising a processor operative to implement a set of instructions to decode programming content of a set of a plurality of CSFs from a common guide medial logical channel (MLC) is provided. The process is further operative to display simultaneously on a display screen programming content of the decoded set of the plurality of CSFs, and automatically switch to a primary bitstream of an active channel associated with a selected one displayed CSF. The integrated circuit further includes a memory coupled to the processor.

In a still further configuration, a computer program product including a computer readable medium having instructions for causing a computer to decode programming content of a set of plurality of CSFs from a common media logical channel (MLC) guide is provided. The instruction further cause the computer to display simultaneously on a display screen content of the decoded set of the plurality of CSFs; and automatically switch to a primary bitstream of an active channel associated with a selected one displayed CSF.

Additional aspects will become more readily apparent from the detailed description, particularly when taken together with the appended drawings.

BRIEF DESCRIPTION OF THE DRAWINGS

Aspects and configurations of the disclosure will become more apparent from the detailed description set forth below when taken in conjunction with the drawings in which like reference characters identify corresponding elements throughout.

Figure 1:
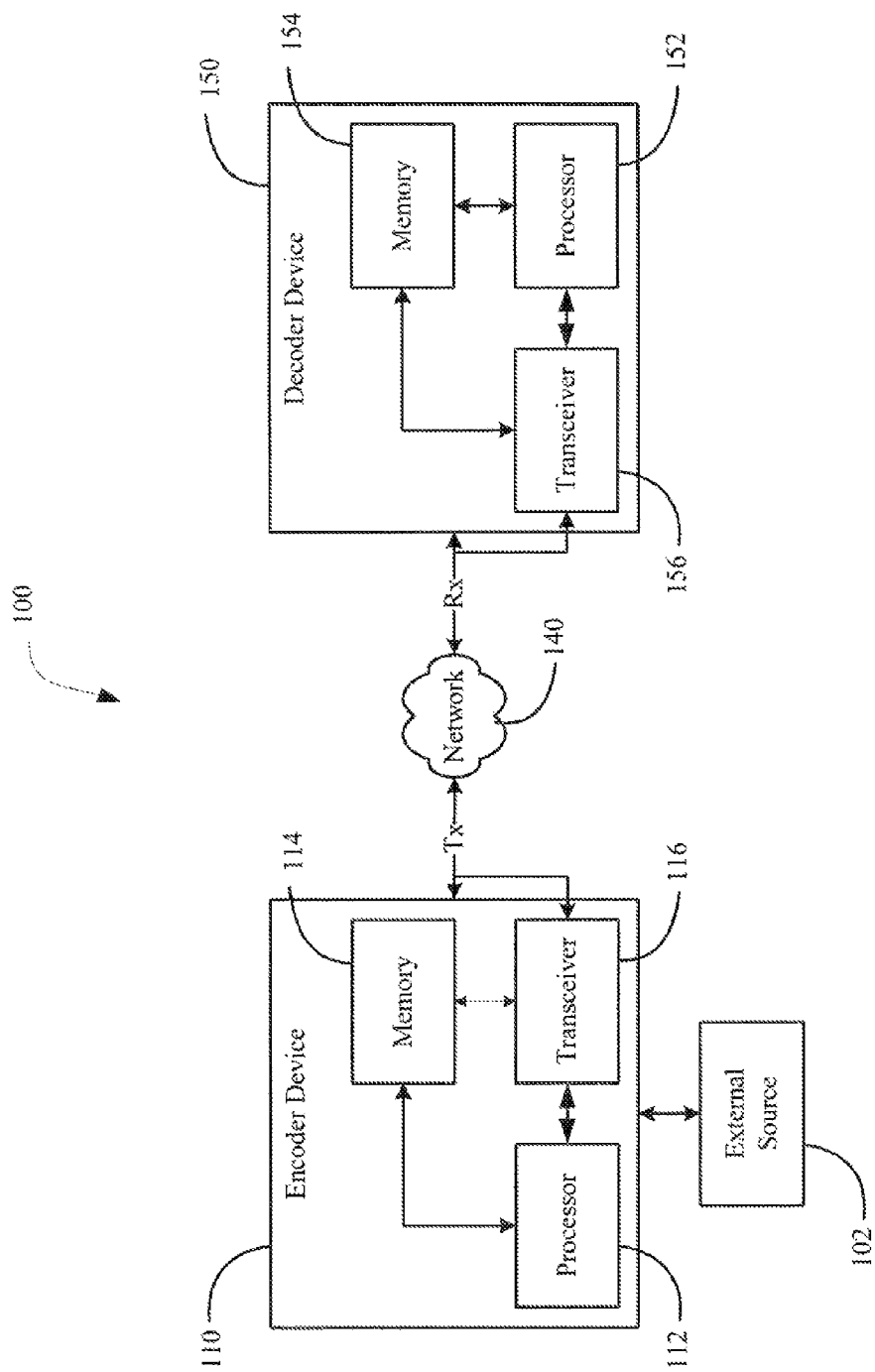
FIG. 1 illustrates a block diagram of an exemplary multimedia communications system according to certain configurations.

The images in the drawings are simplified for illustrative purposes and are not depicted to scale. To facilitate understanding, identical reference numerals have been used, where possible, to designate identical elements that are common to the figures, except that suffixes may be added, when appropriate, to differentiate such elements.

The appended drawings illustrate exemplary configurations of the invention and, as such, should not be considered as limiting the scope of the invention that may admit to other equally effective configurations. It is contemplated that features or blocks of one configuration may be beneficially incorporated in other configurations without further recitation.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs, and the terms "core", "engine", "machine", "processor" and "processing unit" are used interchangeably.

The techniques described herein may be used for wireless communications, computing, personal electronics, etc. An exemplary use of the techniques for wireless communication is described below.

The following detailed description is directed to certain sample configurations of the invention. However, the invention can be embodied in a multitude of different ways as defined and covered by the claims.

Video signals may be characterized in terms of a series of pictures, frames, and/or fields, any of which may further include one or more slices or blocks. As used herein, the term "frame" is a broad term that may encompass one or more of frames, fields, pictures, slices and/or blocks.

Configurations include systems and methods that facilitate channel switching in a multimedia transmission system. Multimedia data may include one or more of motion video, audio, still images, text or any other suitable type of audio-visual data.

FIG. 1 illustrates a block diagram of an exemplary multimedia communications system 100 according to certain configurations. The system 100 includes an encoder device 110 in communication with a decoder device 150 via a network 140. In one example, the encoder device receives a multimedia signal from an external source 102 and encodes that signal for transmission on the network 140.

In this example, the encoder device 110 comprises a processor 112 coupled to a memory 114 and a transceiver 116. The processor 112 encodes data from the external (multimedia data) source and provides it to the transceiver 116 for communication over the network 140.

In this example, the decoder device 150 comprises a processor 152 coupled to a memory 154 and a transceiver 156. The transceiver 156 may be substituted with a receiver. The processor 152 may include one or more of a general purpose processor and/or a digital signal processor. The memory 154 may include one or more of solid state or disk based storage. The transceiver 156 is configured to receive multimedia data over the network 140 and provide it to the processor 152 for decoding. In one example, the transceiver 156 includes a wireless transceiver. The processor 152 may be implemented with one or more DSPs, micro-processors, RISCs, etc. The processor 152 may also be fabricated on one or more application specific integrated circuits (ASICs) or some other type of integrated circuits (ICs).

The techniques described herein may be implemented in various hardware units. For example, the techniques may be implemented in ASICs, DSPs, RISCs, ARMs, digital signal processing devices (DSPDs), programmable logic devices (PLDs), field programmable gate arrays (FPGAs), processors, controllers, micro-controllers, microprocessors, and other electronic units.

The network 140 may comprise one or more of a wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM/GPRS (General packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, a DVB-H system, and the like.

Figure 2A:
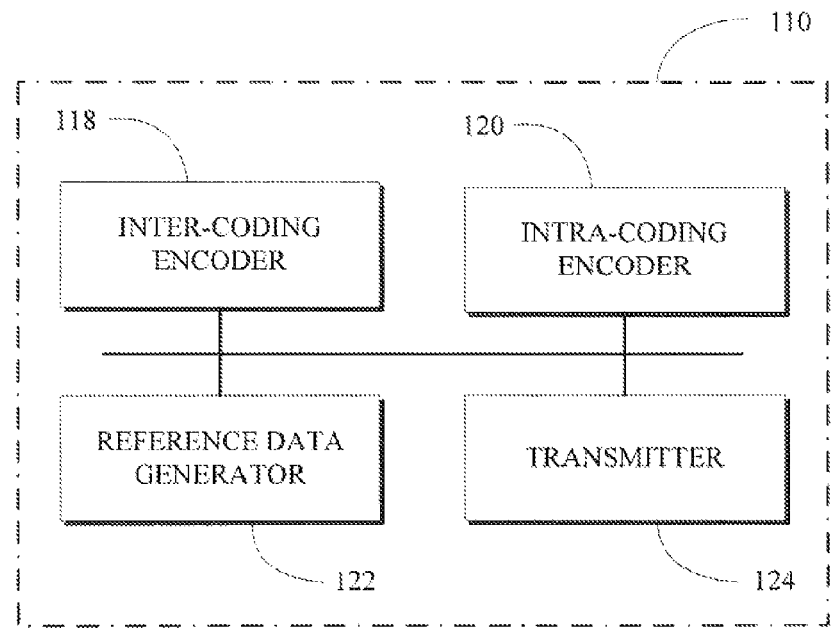
FIG. 2A illustrates a block diagram of an exemplary encoder device.

FIG. 2A illustrates a block diagram of an exemplary encoder device 110 that may be used in system 100 of FIG. 1 according to certain configurations. In this configuration, the encoder device 110 comprises an inter-coding encoder element 118, an intra-coding encoder element 120, a reference data generator element 122 and a transmitter element 124. The inter-coding encoder 118 encodes inter-coded portions of video that are predicted temporally (e.g., using motion compensated prediction) in reference to other portions of video data located in other temporal frames. The intra-coding encoder element 120 encodes intra-coded portions of video that can be decoded independently without reference to other temporally located video data. In some configurations, the intra-coding encoder element 120 may use spatial prediction to take advantage of redundancy in the other video data located in the same temporal frame.

The reference data generator 122, in one aspect, generates data that indicates where the intra-coded and inter-coded video data generated by the encoder elements 120 and 118 respectively are located. For example, the reference data may include identifiers of subblocks and/or macroblocks that are used by a decoder device 150 to locate a position within a frame. The reference data may also include a frame sequence number used to locate a frame within a video frame sequence.

The transmitter 124 transmits the inter-coded data, the intra-coded data, and, in some configurations, the reference data, over a network such as the network 140 of FIG. 1. The data may be transmitted over one or more communication links. The terms communication links are used in a general sense and can include any channels of communication including, but not limited to, wired or wireless networks, virtual channels, optical links, and the like. In some configurations the intra-coded data is transmitted on a base layer communication link and the inter-coded data is transmitted over an enhancement layer communication link. In some configurations, the intra-coded data and the inter-coded data are transmitted over the same communication link. In some configurations, one or more of the inter-coded data, the intra-coded data and the reference data may be transmitted over a sideband communication link. For example, a sideband communication link such as the Supplemental Enhancement Information (SEI) messages of H.264 or user_ data messages of MPEG-2 may be used. In some configurations, one or more of the intra-coded date, the inter-coded data and the reference data are transmitted over a virtual channel. A virtual channel may comprise data packets containing an identifiable packet header that identifies the data packet as belonging to the virtual channel. Other forms of identifying a virtual channel are known in the art such as frequency division, time division, code spreading, etc.

Figure 2B:
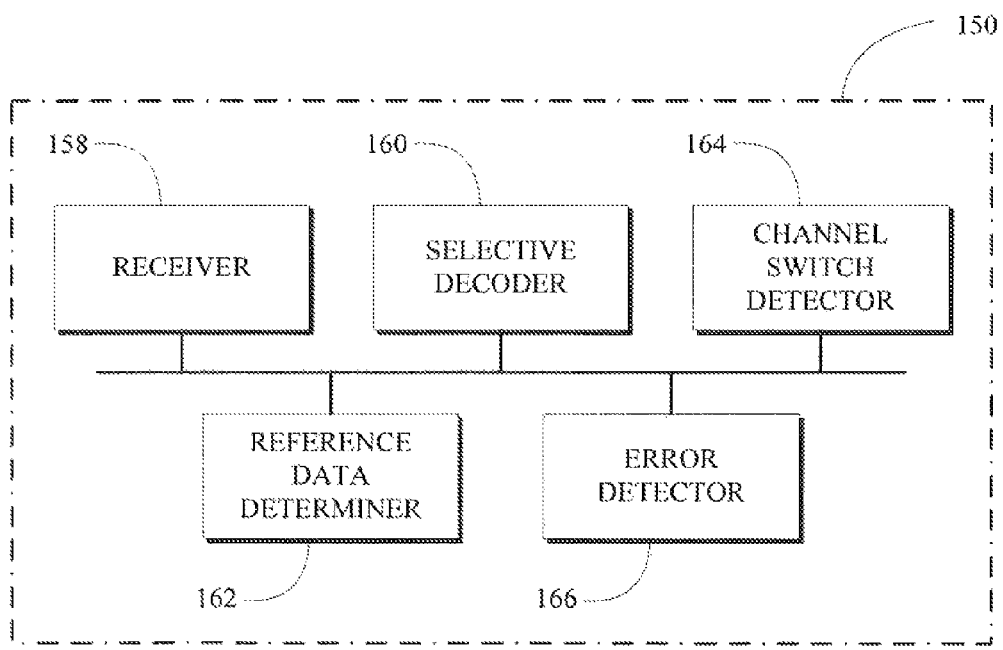
FIG. 2B illustrates a block diagram of an exemplary decoder device.

FIG. 2B illustrates a block diagram of an exemplary decoder device 150 that may be used in system 100 of FIG. 1 according to certain configurations. In this configuration, the decoder device 150 comprises a receiver element 158, a selective decoder element 160, a reference data determiner element 162, and one or more reference data availability detectors such as a channel switch detector element 164 and an error detector element 166.

The receiver 158 receives encoded video data (e.g., data encoded by the encoder 110 of FIGS. 1 and 2A). The receiver 158 may receive the encoded data over a wired or wireless network such as the network 140 of FIG. 1. The data may be received over one or more communication links. In some configurations, the intra-coded data is received on a base layer communication link and the inter-coded data is received over an enhancement layer communication link. In some configurations, the intra-coded data and the inter-coded data are received over the same communication link. In some configurations, one or more of the inter-coded data, the intra-coded data and the reference data may be received over a sideband communication link. For example, a sideband communication link such as the Supplemental Enhancement Information (SEI) messages of H.264 or user_ data messages of MPEG-2 may be used. In some configurations, one or more of the intra-coded data, the inter-coded data and the reference data are received over a virtual channel. A virtual channel may comprise data packets containing an identifiable packet header that identifies the data packet as belonging to the virtual channel. Other forms of identifying a virtual channel are known in the art.

The selective decoder 160 decodes the received inter-coded and intra-coded video data. In some configurations, the received data comprises an inter-coded version of a portion of video data and an intra-coded version of the portion of video data. Inter-coded data can be decoded after the reference data upon which it was predicted is decoded. For example, data encoded using motion compensated prediction comprises a motion vector and a frame identifier identifying the location of the reference data. If the portion of the frame identified by the motion vector and the frame identifier of the inter-coded version is available (e.g., already decoded), then the selective decoder 160 can decode the inter-coded version. If however, the reference data is not available, then the selective decoder 160 can decode the intra-coded version.

The reference data determiner 162, in one aspect, identifies received reference data that indicates where the intra-coded and inter-coded video data in the received encoded video data are located. For example, the reference data may include identifiers of subblocks and/or macroblocks that are used by the selective decoder 160 to locate a position within a frame. The reference data may also include a frame sequence number used to locate a frame within a video frame sequence.

Using this received reference data enables a decoder 160 to determine if the reference data upon which inter-coded data depends is available.

Reference data availability can be affected by a user switching a channel of a multi-channel communication system. For example, multiple video broadcasts may be available to the receiver 158, using one or more communication links. If a user commands the receiver 158 to change to a different broadcast channel, then reference data for the inter-coded data on the new channel may not be immediately available. The channel switch detector 164 detects that a channel switch command has been issued and signals the selective decoder 160. Selective decoder 160 can then use information obtained from the reference data determiner to identify if reference data of the inter-coded version is unavailable, and then identify the location of the nearest intra-coded version and selectively decode the identified intra-coded version.

Reference data availability can also be affected by errors in the received video data. The error detector 166 can utilize error detection techniques (e.g., forward error correction) to identify uncorrectable errors in the bitstream. If there are uncorrectable errors in the reference data upon which the inter-coded version depends, then the error detector 166 can signal the selective decoder 160 identifying which video data are affected by the errors. The selective decoder 160 can then determine whether to decode the inter-coded version (e.g., if the reference data is available) or to decode the intra-coded version (e.g., if the reference data is not available).

In certain configurations, one or more of the elements of the encoder device 110 of FIG. 2A may be rearranged and/or combined. The elements may be implemented by hardware, software, firmware, middleware, microcode or any combination thereof. In certain configurations, one or more of the elements of the decoder 160 of FIG. 2B may be rearranged and/or combined. The elements may be implemented by hardware, software, firmware, middleware, microcode or any combination thereof.

Certain configurations of this disclosure can be implemented using MediaFLO™ video coding for delivering real-time video services in TM3 systems using the FLO Air Interface Specification, "Forward Link Only [FLO] Air Interface Specification for Terrestrial Mobile Multimedia Multicast", published as Technical Standard TIA-1099, August 2006, which is fully incorporated herein by reference for all purposes. The channel switch frame (CSF) as used by MediaFLO™ assists channel change, as the name implies. There are a number of other applications that extend and/or take advantage of the value gained by using CSFs. The remainder of this disclosure identifies some specific applications using CSFs and describes their implementations. Channel Switch Frame (CSF), as defined herein, is a low quality, small data size, structure that allows a streaming codec to acquire quickly, which can be prior to the arrival of a high quality instantaneous decoding refresh (IDR) frame. A CSF can alternately be an I-frame or a fraction of the I-frame size.

Thumbnail/Common Guide MLC

Figure 3:
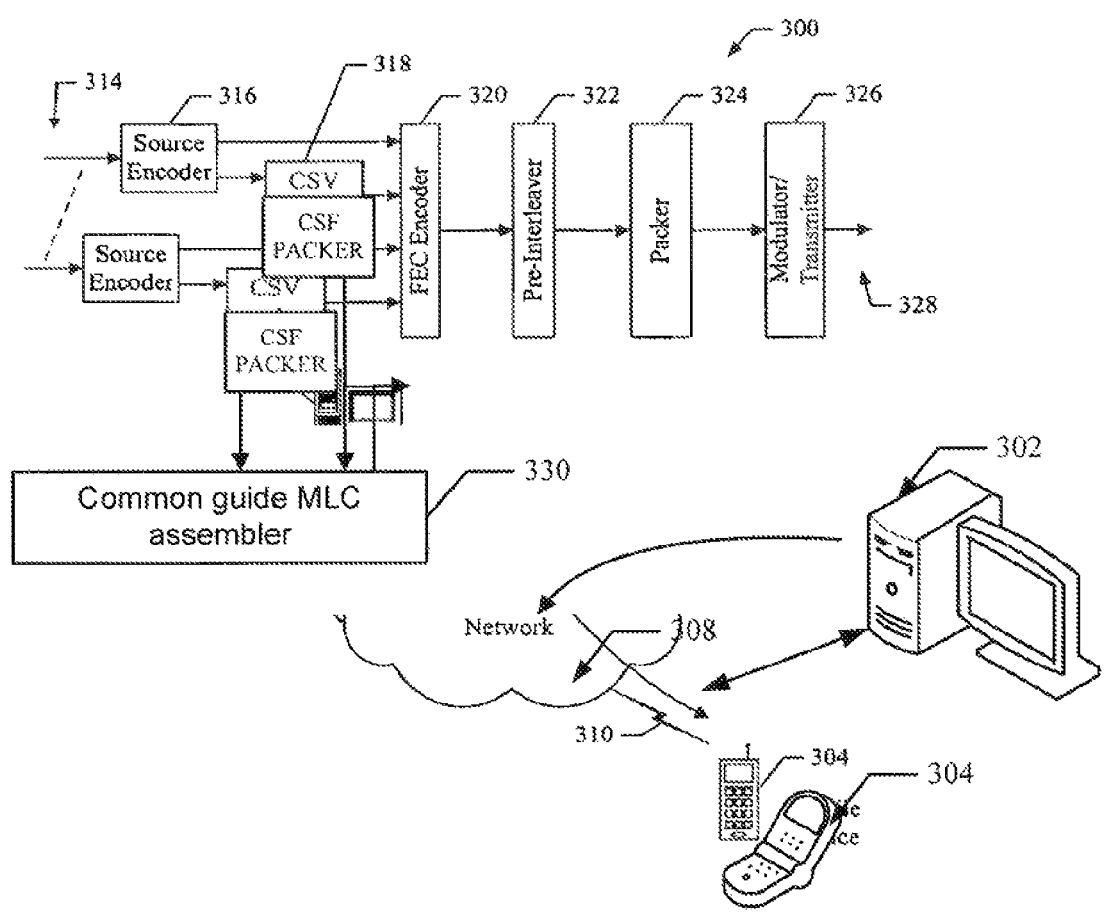
FIG. 3 illustrates a network that comprises an aspect of a service acquisition system.

FIG. 3 shows a network 300 that comprises an aspect of a service acquisition system. The network 300 comprises a broadcast server 302 that operates to broadcast a multimedia multiplex to a device 304 using a network 306. The server 302 communicates with the network 306 through communication link 308 that comprises any suitable type of wired and/or wireless communication link. The network 306 communicates with the device 304 through communication link 310 that in this aspect comprises any suitable type of wireless communication link. For example, the communication link 310 may comprise an orthogonal frequency division multiplex (OFDM) communication link known in the telecommunication industry.

The device 304 is a mobile telephone but may comprise any suitable device, such as a PDA, email device, pager, notebook computer, tablet computer, desktop computer or any other suitable device that operates to receive a multimedia multiplex signal.

In an aspect of the service acquisition system, the server 302 comprises source encoders 316 that operate to receive input video signals 314. In an aspect, 256 input video signals are input to 256 source encoders 316. However, aspects of the system are suitable for use with any number of input video signals and corresponding source encoders.

Each of the source encoders 316 produces an encoded signal that is input to a forward error correction (FEC) encoder 320. Each of the source encoders 316 also produces a channel switch video signal (also referred to as channel switch frame (CSF)) that is input to a CSF packer 318. The CSF signal is a low resolution independently decodable version of a corresponding input signal. A more detailed description of the CSF signal. The CSF packers 318 operate to pack (or encapsulate) the CSF signals and outputs encapsulated CSF signals to the FEC encoder 320.

In another aspect, the CSF signal in the primary bitstream may be omitted. Bitrate saving in aggregate bitrate per channel can be achieved (that translates to lower power consumption attributed for example to receiving, demodulating and decoding less media data), if the CSF signal is not transmitted in a channnel's primary bitstream.

The FEC encoder 320 operates to error control encode the signals received from the source encoders 316 and the CSF packers 318 to produce error encoded blocks that are input to a pre-interleaver 322. In an aspect, the FEC encoder 320 provides RS coding. The pre-interleaver 322 arranges the error encoded blocks so that selected blocks appear at predetermined locations in a transmission frame after the operation of a packer 324. For example, the pre-interleaver 322 operates to perform the functions described above to maintain the continuous nature of the application data in the generated transmission frames. As a result, the pre-interleaver 322 operates to arrange the error coded blocks so that they are optimized to provide fast service acquisition.

The packer 324 operates to encapsulate the output of the pre-interleaver 322 into a transmission frame. The operation of the pre-interleaver 322 enables fast service acquisition because it positions the CSF and other important frame information at strategic locations in the transmission frame so that fast service acquisition can occur.

The output of the packer 324 is a transmission frame that is input to a modulator/transmitter 326 that operates to transmit a modulated transmission frame 328 over the network 306. For example, the modulated transmission frame 328 is transmitted from the server 302 to the device 304 using the network 306. The transmission frame 328 comprises a sequence of superframes where each superframe comprises four frames.

The network 300 further includes a common guide MLC assembler 330. The common guide MLC assembler 330 is operatively coupled to receive the packed CSF from each independent CSF packer 318. The common guide MLC assembler 330 generates a single multicast guide media logical channel, (hereinafter referred to as a "common guide MLC"). The guide media logical channel is a physical layer logical channel.

Figure 4:
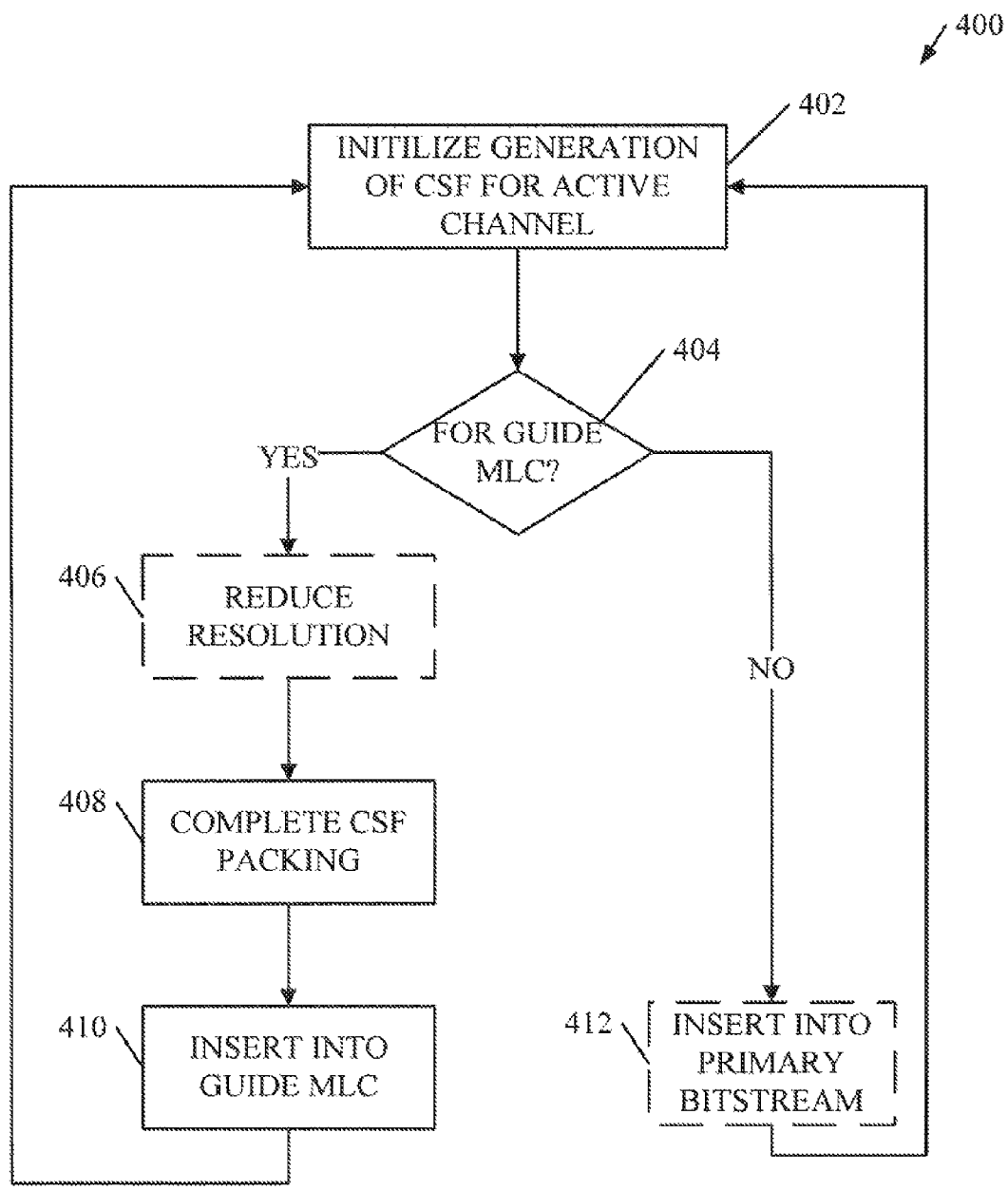
FIG. 4 illustrates a flowchart of a process for generation of a common guide MLC.
Figure 5:
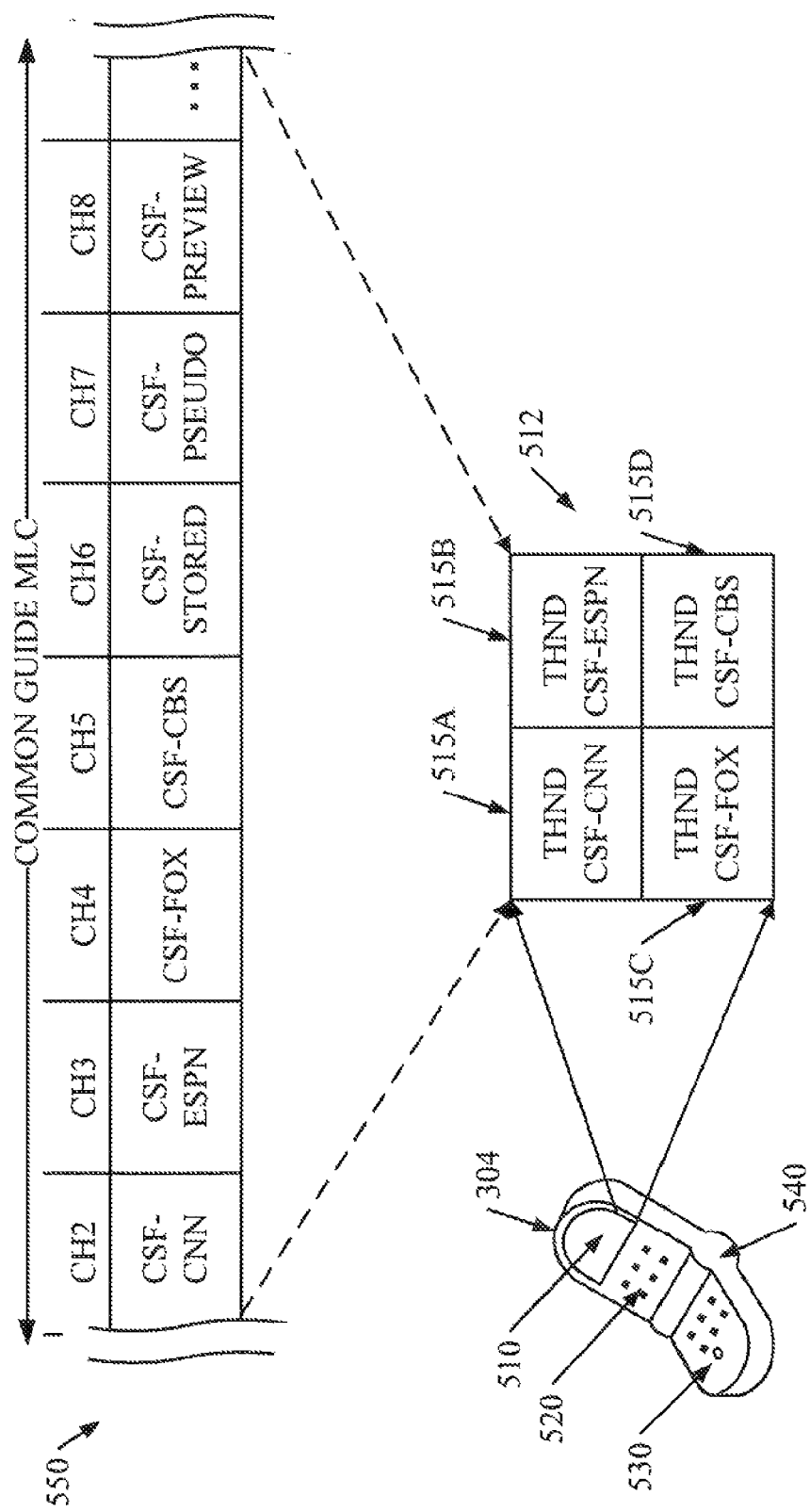
FIG. 5 illustrates a device receiving a common guide MLC.

FIG. 4 illustrates a flowchart of a process 400 for generation of a common guide MLC 550 (FIG. 5). In various configurations below, flowchart blocks are performed in the depicted order or these blocks or portions thereof may be performed contemporaneously, in parallel, or in a different order. The process 400 for the generation of a common guide MLC 550 begins with block 402 where a CSF for an active channel is generated. In an aspect, each source encoder 316 represents one active channel.

Block 402 is followed by block 404 where a determination is made whether the CSF if for the common guide MLC 550. If the determination at block 404 is "YES," then the resolution may be (optionally) reduced at block 406. Block 406 is followed by block 408 where the CSF is packed by CSF packer 318. Block 408 is followed by block 410 where the CSF is sent to the common guide MLC assembler 330 so that it may be inserted into the common guide MLC 550, such as, through multiplexing. Block 410 returns to block 402 where a CSF for an active channel is generated.

In this configuration, block 406 is represented in a dashed block to denote that this block is optional and may be a function of the capabilities of the network 300 and device 304, as will be described in more detail later.

Returning to block 404, if the determination is "NO," then block 404 is followed by block 412 where the CSF is inserted into the primary bitstream for the channel (FIG. 7) via the FEC encoder 320. The block 412 loops back to block 402.

FIG. 5 illustrates a device 304 receiving a common guide MLC 550. An exemplary configuration of the common guide MLC 550 includes a plurality of channel CSFs where each CSF is associated with a respective one channel. For example, there may be 256 active channels. In the exemplary configuration, the common guide MLC 550 is located on channel 1. The active channels are located on channels CH2, CH3, CH4, CH5, CH6, CH8, . . . , etc. For illustration, the active channel CH 2 may be related to CNN and has a corresponding CSF denoted as CSF-CNN. The active channel CH 3 may be related to ESPN and has a corresponding CSF denoted as CSF-ESPN. The active channel CH 4 may be related to FOX and has a corresponding CSF denoted as CSF-FOX. The active channel CH 5 may be related to CBS and has a corresponding CSF denoted as CSF-CBS. The active channels CH1-CH5 are associated with real-time continuous streaming program content.

The active channel CH 6 may be related to stored files and has a corresponding CSF denoted as CSF-STORED. The active channel CH 7 may be related to pseudo-streaming program content and has a corresponding CSF denoted as CSF-PSEUDO. The active channel CH 8 may be related to a preview channel and has a corresponding CSF denoted as CSF-PREVIEW. There may be a plurality of pseudo-streaming channels and a plurality of stored channels. Thus, the common guide MLC 550 may have a plurality of individually separate CSFs for direct entry to a plurality of pseudo-streaming content server(s) via a link. Likewise, for each stored channel, the common guide MLC 550 would have a separate CSF for direct entry to the stored program.

In the exemplary configuration, the device 304 is a mobile phone with video capability. The device 304 may include a display 510, a keypad 520 and microphone/speaker combination 530 incorporated in to the device housing 540. For the device 304 to receive communications from network 300 via network 306, the device 304 has subscribed to receive mobile television (TV) channels or other video services in accordance with a particular subscription package. The subscription packages group together one or more channels for a preset fee structure. In many cases subscription packages are tiered. Each tier adding additional channels for the lower tier of channels. Nevertheless, the subscription packages may offer separate and distinct services available on one or more active channels. Accordingly, depending on the subscription, the device 304 may receive one or more of real-time streaming TV channels, pseudo-streaming TV channels, stored files channels, a preview channel and the common guide MLC 550.

The common guide MLC 550 provides a single access point for potentially all media in a waveform (or even multiple waveforms) for quick access to a universal set of media services by a universal set of device 304. The CSFs for all active channels are collected into the common guide MLC 550. Therefore, regardless of the subscription package, the common guide MLC 550 serves as a single source of access and acquisition to available active channels. The common guide MLC 550 is used as a single multicast media logical channel (MLC). The common guide MLC 550 allows the device 304 (i.e., the device receiving the media) to tile single CSFs from multiple channel sources in the form of thumbnail tiles, directly from the common guide MLC 550. The common guide MLC 550 may be used for the acquisition of any active channel. For the sake of understanding, an active channel is any channel being broadcast by the network 300. However, depending on the subscription service, the device 304 may only have access to a subset of the total available active channels.

In a further aspect, there may be a different common guide MLC 550 for each tiered subscription package, video service or broadcast service. One common guide MLC 550 would be for a premium subscription package. Another common guide MLC could be for a basic subscription package. In this example, if the basic subscription package did not permit stored programs or pseudo-streaming services, the CSFs for those services could be omitted from a basic subscription common guide MLC.

In one aspect, any one particular device 304 may be able to view all media in the common guide MLC 550. However, access to a particular channel's primary bitstream would be blocked for those channels which are not part of the subscription service. In another aspect, if the user selects a non-subscription channel displayed on the thumbnail guide display 512, the user may be denied viewing of those non-subscription channels from the common guide MLC 550.

In operation, when the device 304 is tuned to or has selected the reception for the common guide MLC 550, the decoder 160 will decode the N channel CSFs and display the thumbnail guide display 512. The thumbnail guide display 512 displays a corresponding independent channel thumbnail (THND) tile 515A, 515B, 515C and 515D for each decoded active channel CSF.

For illustration, the display 510 displays N number of thumbnail tiles 515A, 515B, 515C and 515D. In the example, N is equal to 4. However, N may be any integer number and may be a function of the display size. Here the currently displayed thumbnails (THND) tiles 515A, 515B, 515C and 515D are for CSF-CNN, CSF-ESPN, CSF-FOX and CSF-CBS. The user of the device 304 is also able to scroll through a plurality of thumbnail (THND) tiles 515A, 515B, 515C and 515D. As, the user scrolls, thumbnail tiles are updated with the next channel's CSFs thumbnail tile. The term next may be in a next channel in consecutive order or the next available channel order or some other order.

This feature has an advantage (of many) that the common guide MLC 550 need not be accessed at all unless the device 304 is changing channels or displaying the common guide MLC 550. There is an added power savings since the channel switch frames (CSFs) need not be delivered with the real-time or pseudo streaming program content while watching the active channel (program content decoded from the channel's primary bitstream). As mentioned previously, bitrate savings in aggregate bitrate per channel can be achieved (which translates to lower power consumption) if CSFs are not transmitted in the primary bitstream.

Figure 7:
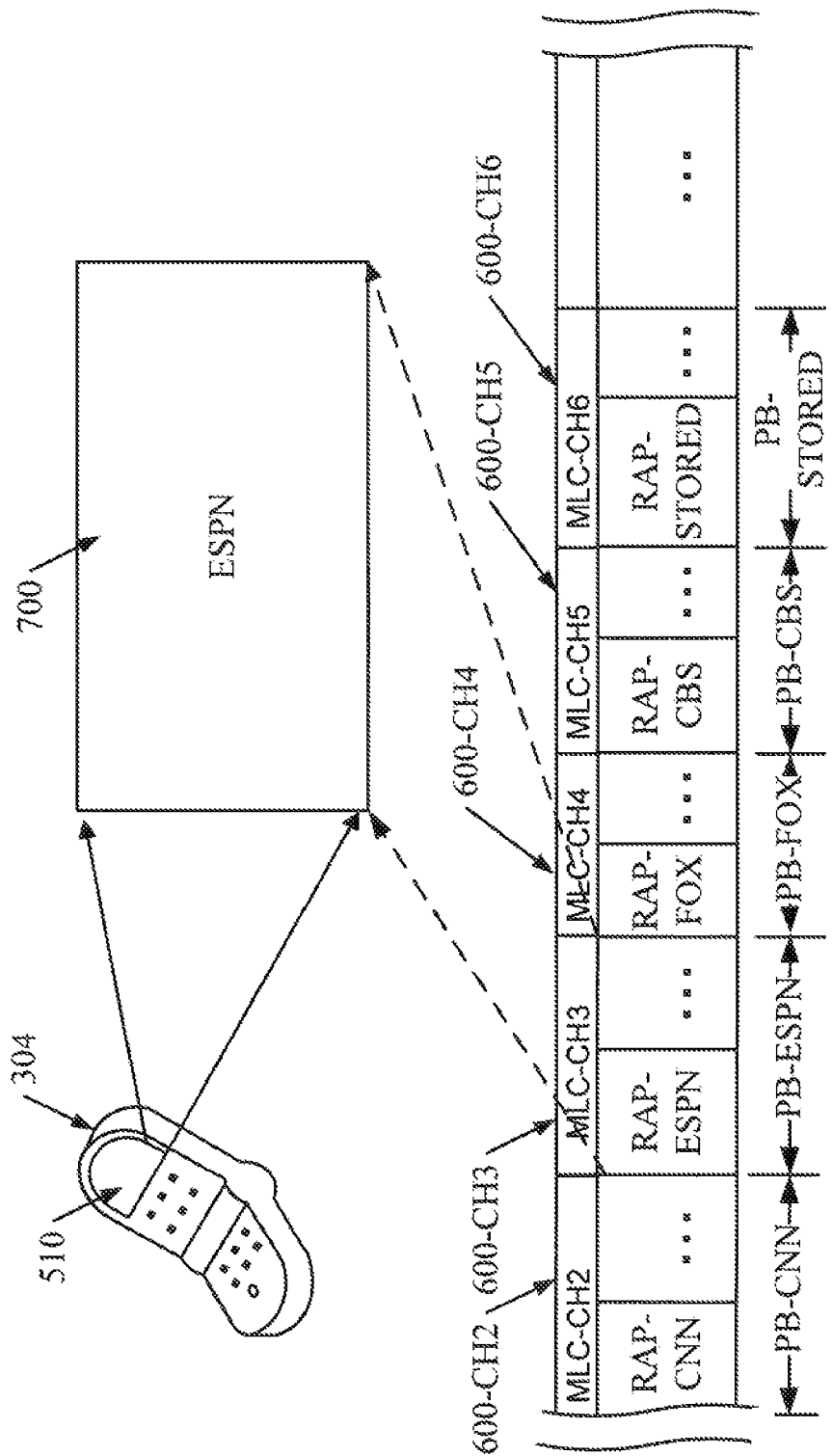
FIG. 7 illustrates reception and display of a primary bitstream.

A further advantage of the common guide MLC 550 is simplified tiled displays of program content. The common guide MLC 550, instead of providing a tiled view of multiple channels being represented therein, may provide a picture-in-picture effect, whereby one or more of the tiles from the multi-tiled preview is overlaid onto the current channel being view in full (FIG. 7).

Figure 6A:
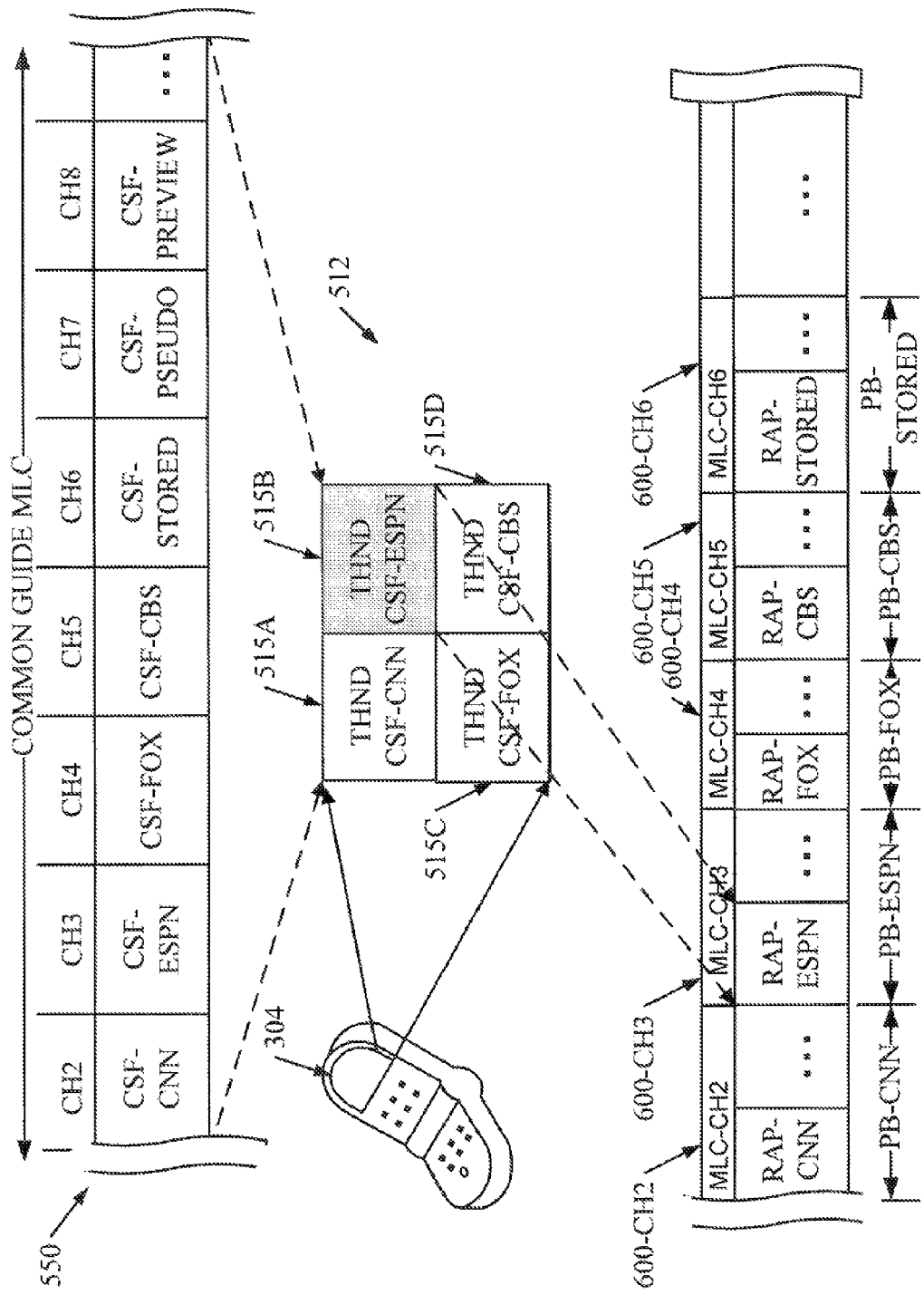
FIG. 6A illustrates a transition (direct entry) from a guide thumbnail tile to a channel's primary bitstream.

In FIG. 6A, the guide thumbnail tile 515B is highlighted to designate that it is a currently selected guide thumbnail tile. The currently selected guide thumbnail tile 515B is for channel CH3. Channel CH3 corresponds to ESPN. When the currently selected guide thumbnail tile 515B is selected, the decoder 160 will directly enter the primary bitstream 600-CH3 for channel CH3. The primary bitstream 600-CH3 for channel CH3 (ESPN) has a duration denoted as PB-ESPN. The primary bitstream 600-CH3 includes a multicast logical channel (MLC) for channel CH3. The decoder may listen to the MLC-CH3 to find a random access point (RAP) to enter the corresponding primary bitstream 600-CH3. The primary bitstream 600-CH3 includes at least one RAP-ESPN followed by additional program content or GOP frames.

For illustrative purposes, the primary bitstream 600-CH2 includes at least one RAP-CNN followed by additional program content or coded frames. The duration of the primary bitstream 600-CH2 is denoted by PB-CNN. The primary bitstream 600-CH2 has associated therewith a MLC denoted as MLC-CH2. The primary bitstream 600-CH4 includes at least one RAP-FOX followed by additional program content or GOP frames. The primary bitstream 600-CH4 has associated therewith a MLC denoted as MLC-CH4 and has a duration denoted by PB-FOX. The primary bitstream 600-CH5 includes at least one RAP-CBS followed by additional program content or GOP frames. The primary bitstream 600-CH5 has associated therewith a MLC denoted as MLC-CH5 and has a duration denoted by PB-CBS. The primary bitstream 600-CH6 includes at least one RAP-STORED followed by additional program content or GOP frames. The primary bitstream 600-CH6 has associated therewith a MLC denoted as MLC-CH6 with a duration denoted by PB-STORED.

Figure 6B:
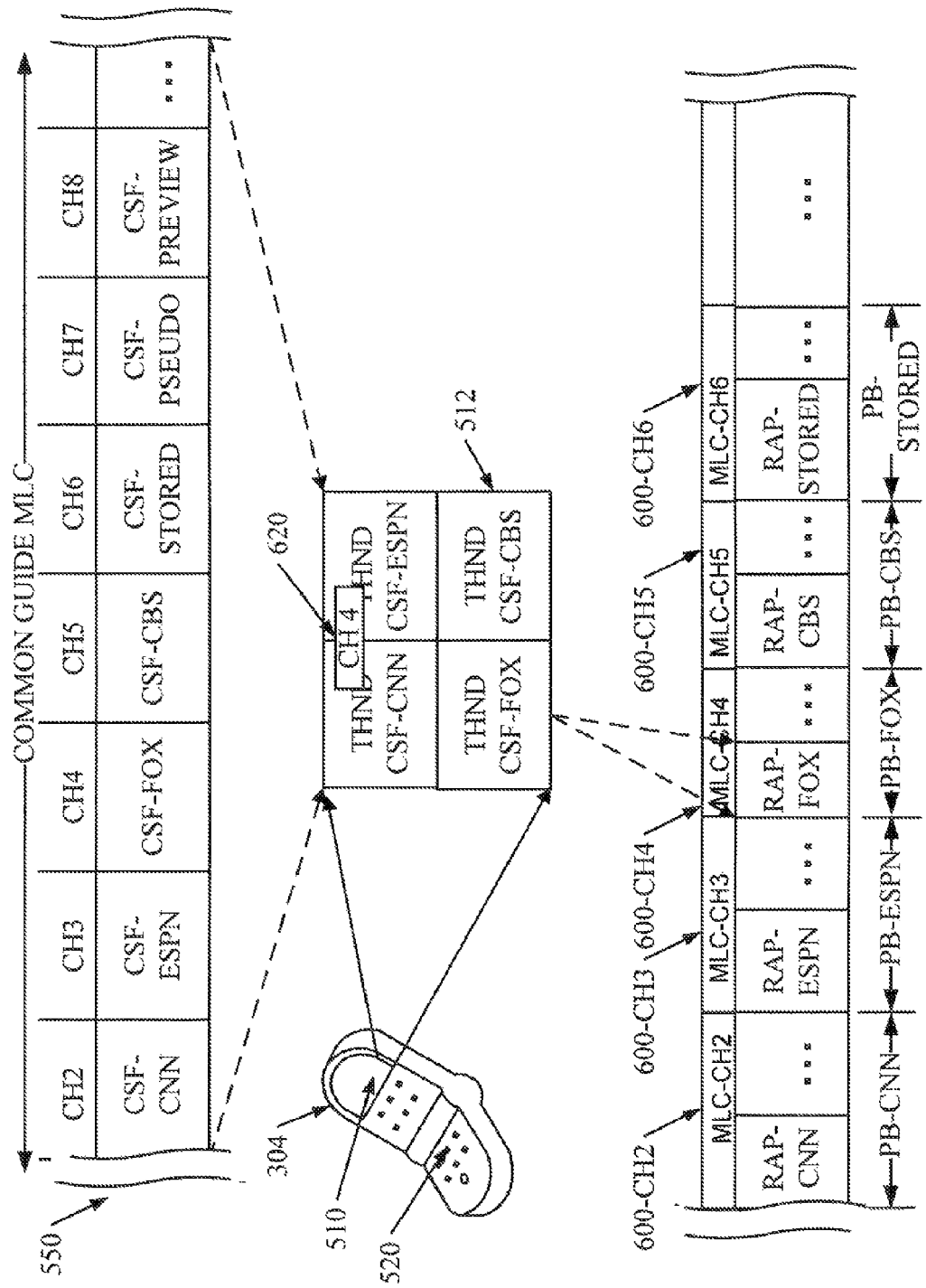
FIG. 6B illustrates a device transition (direct entry) from a guide thumbnail to a channel primary bitstream using a channel identification.

FIG. 6A illustrates a transition (direct entry) from a guide thumbnail tile 515B to a channel's primary bitstream using a highlighted selection. In another aspect, FIG. 6B illustrates a transition between a guide thumbnail to a channel primary bitstream using a channel identification. The common guide MLC 550 also provides for direct entry to a channel that is not next to, or sequential to, the current channel as shown in the thumbnail guide display 512. As best seen in FIG. 6B, the user can enter a channel number or ID via keypad 520 while viewing the thumbnail guide display 512 to switch to his/her channel of choice (without having to browse, or scroll, through the channels in between the current channel and the channel of choice). This mechanism is a cost (bitrate, power consumption, etc.) effective alternative compared to other existing schemes where a multiplex of substreams of each channel needs to be transmitted to enable direct entry.

The arrangement of channels and their corresponding CSFs in FIGS. 6A, 6B and 7 are for illustrative purposes. The arrangement of the channel numbers is an example and do not have to occur in the same order as their corresponding CSFs in the common guide MLC 550.

The entered channel number or ID is shown as an overlaid channel number 620 placed over the thumbnail guide display 512. In the example of FIG. 6B, the entered channel number is CH4. Channel CH4 corresponds to FOX. Hence, the decoder device 150 will transition to the primary bitstream 600-CH4.

FIG. 7 illustrates reception and display of a primary bitstream. In this example, the channel selected is channel CH3 for ESPN (FIG. 6A). In another aspect, the entered channel number or ID may be placed over the program content on display 700 for channel selection. Now that that the program content is being displayed, the remaining GOP or other content are decoded and displayed on display 700.

The common guide MLC 550 may be transmitted at any arbitrary frequency, e.g. once a second for fast channel switching to once in a few seconds for moderate latency in channel change times with some power savings. The common guide MLC 550 may be located at an arbitrary point in the transmitted multiplex—at the beginning or end or aligned with a suitable acquisition point with physical layer or application layer (such as, to enable trick play). The presence of the common guide MLC 550 can be indicated by means of acquisition metadata on every channel represented by the common guide MLC 550 (e.g., stream 0 or an alpha channel) or that pertaining to the overall multiplex.

The common guide MLC 550 may contain random access information not just for real-time streaming program channels but for other video services as well (e.g. stored files, pseudo-streaming, commercials, teasers, etc).

Figure 16:
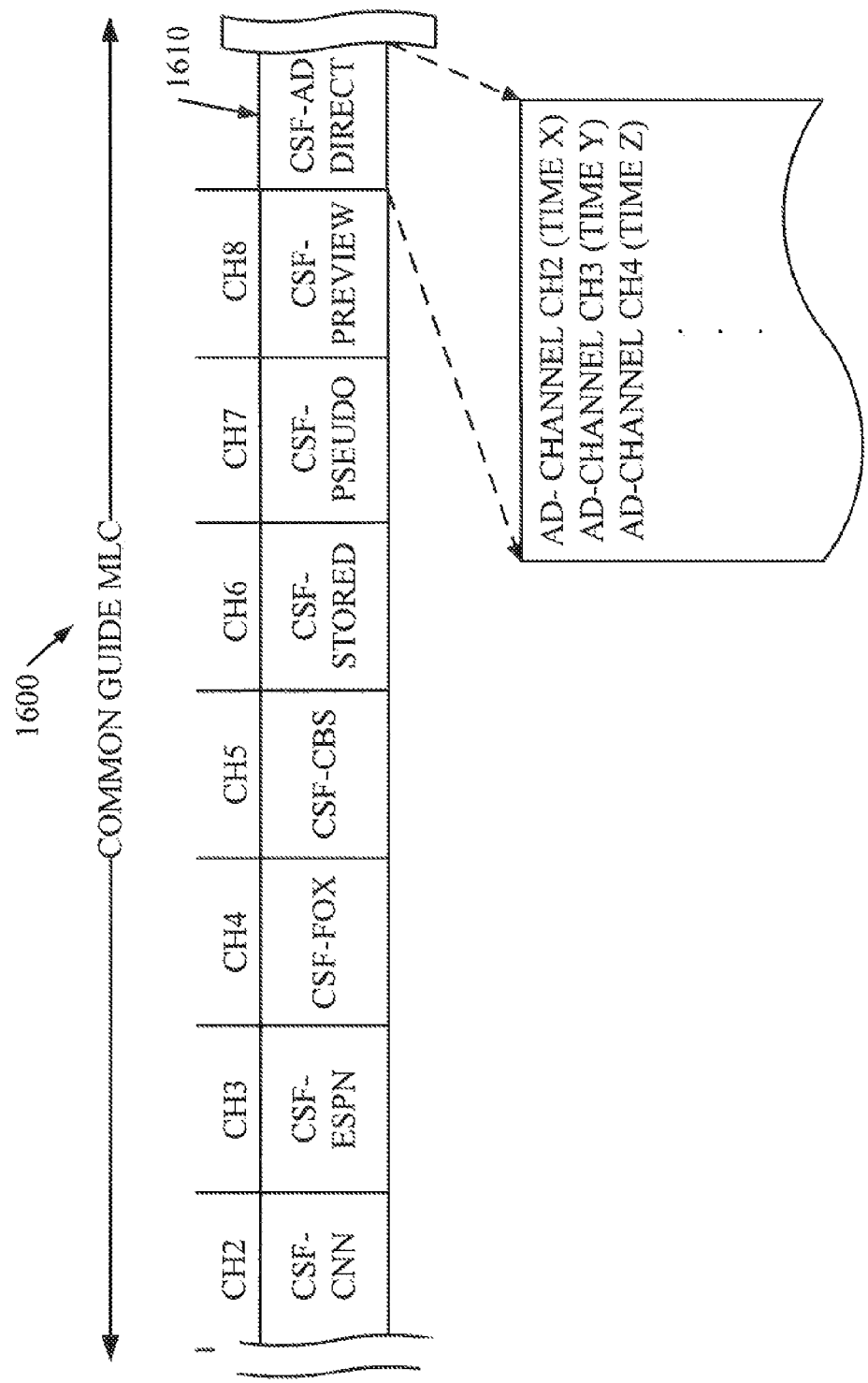
FIG. 16 illustrates another aspect of a common guide MLC.

FIG. 16 illustrates another aspect of a common guide MLC 1600. The common guide MLC 1600 contains an ad insertion location directory CSF 1610 for all channels or some of the channels. This allows signaling and the required access frame to be found in a common location. The ad-directory would include a list of ads for channels and related times or splice points such as location time X, time Y and time Z. These location times or splice points may be the same or different.

Figure 8:
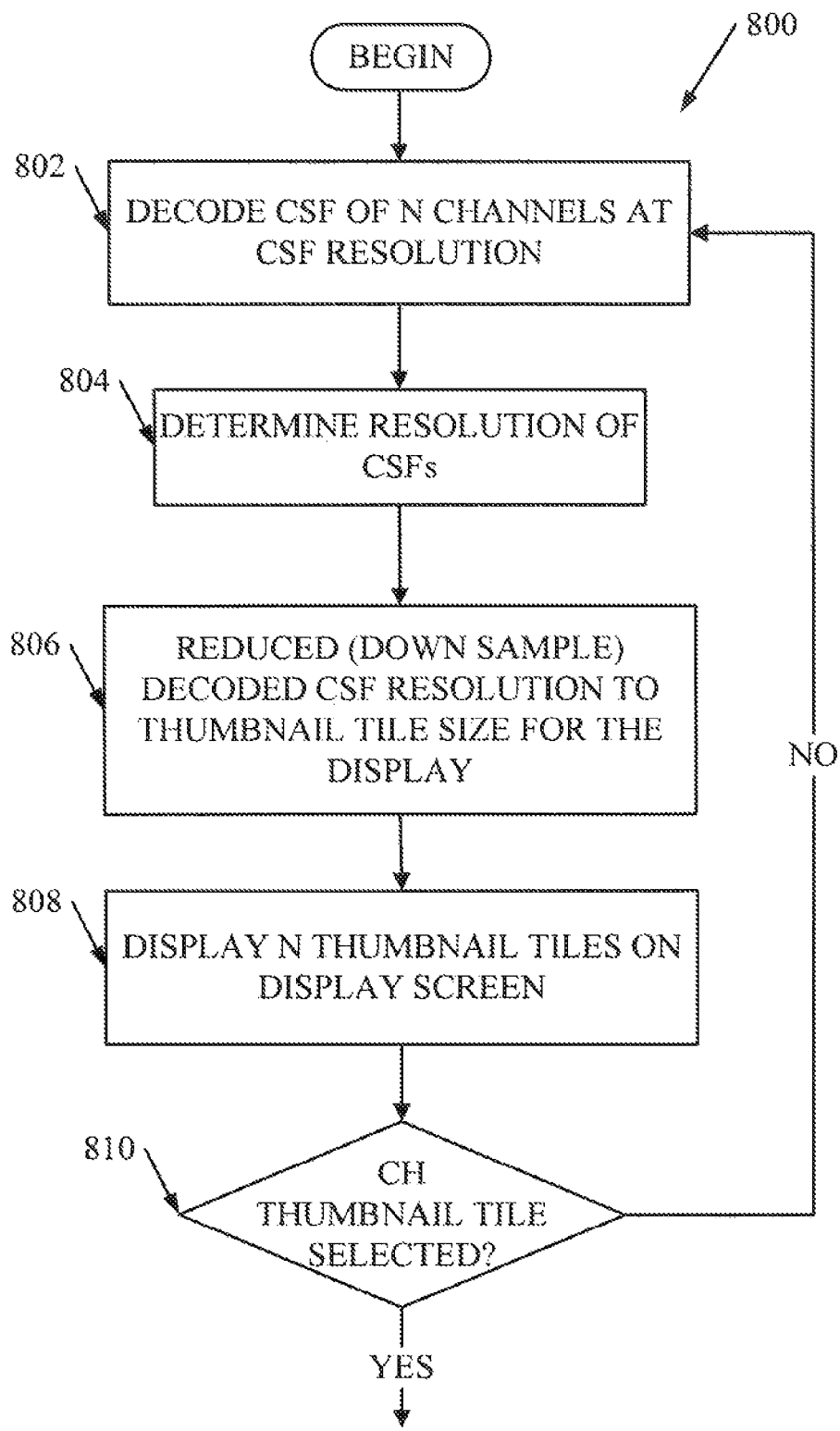
FIG. 8 illustrates a flowchart of the process for reduced resolution decoding of channel switch frame and display thereof.

FIG. 8 illustrates a flowchart of the process 800 for reduced resolution decoding of channel switch frame and display thereof. The CSFs can be of lower resolution for the thumbnail guide display 512 with multiple tiles or for previews (for e.g. when browsing through the program guide). The process 800 begins with block 802 where the decoder 160 will decode the CSF of N channels at the CSF resolution. Block 802 is followed by block, 804 where the resolution of the CSFs is determined. For example, the display 510 may be capable of displaying a video graphics array (VGA) type resolution. However, the CSF may be sent at a quarter of the VGA resolution (hereinafter referred to as QVGA). Block 806 is followed by block 806 where the decoder 160 will reduce (down sample) the decoded CSF resolution to the thumbnail tile size for the thumbnail guide display 512. Since N is equal to 4 in this example, the QVGA resolution for a single CSF is further reduced by 1/N or ¼. Thus, the displayed thumbnail (THND) tiles are each down-sampled by a quarter (Q) again to a QQVGA resolution. Block 806 is followed by block 808 where the N thumbnail (THND) tiles are displayed. Block 808 is followed by block 810 where a determination is made whether a channel thumbnail (THND) tile has been selected. If the determination is "NO," the process 800 loops back to block 802 for the next intervals set of CSF frames. Alternately a channel number may have been entered or some other action. Nonetheless, for this example, the channel thumbnail (THND) tile 515B has been selected. Thus, at block 810, the process 800 continues to FIG. 9 at block 902.

Tiled displays may be, for example, in 2×2 landscape mode through dyadic scaling, or in 3×5 portrait mode through appropriate resampling of resolution and, as might potentially be necessary, frame rate. Those skilled in the art will appreciate that many possible tiled display options are possible, all of which are intended to be within the scope of the configurations described herein.

Figure 9:
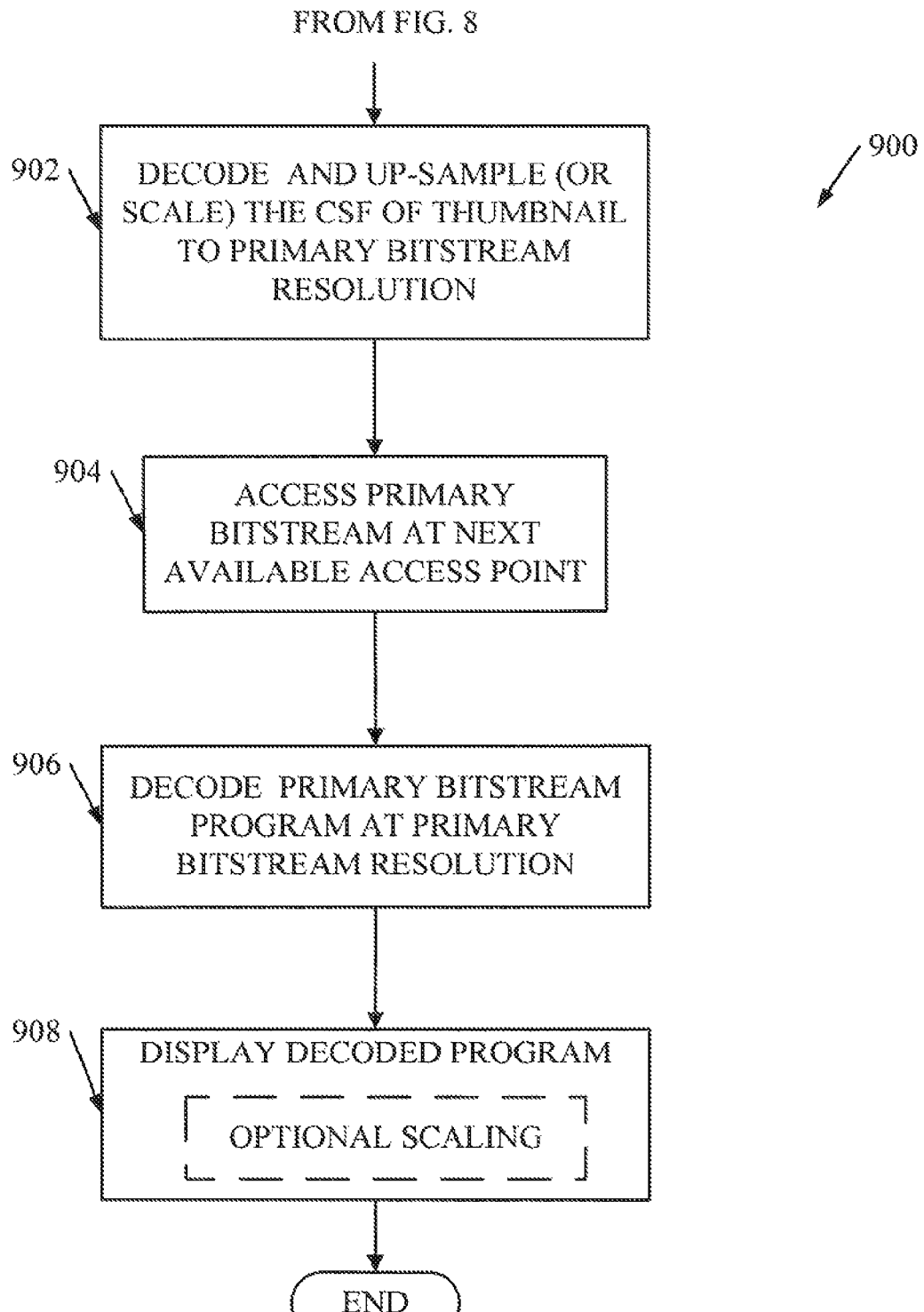
FIG. 9 illustrates a flowchart of the process to access a channel's primary bitstream and display thereof.

FIG. 9 illustrates a flowchart of the process 900 to access a channel's primary bitstream and display thereof from the common MLC channel 550. In tiled displays, the entry to an active channel's primary bitstream may be enabled by selecting the CSF tile for the chosen channel. In the aspect above, the CSF is sent at a lower resolution (resulting in bitrate savings for the CSF). Thus, the device 304 does not need to scale (decimate) the CSF to get a smaller image (thumbnail tile). In one aspect, the device 304 may still utilize the reduced resolution version to acquire an active channel by simply scaling up the thumbnail tile to the nominal resolution of the primary bitstream of the selected active channel. This process reduces the computation load for the handset and hence saves power for any thumbnail guide view.

The process 900 will now be described. The process 900 begins with block 902 based on the condition of block 810 of FIG. 8. At block 902, the decoder 160 will decode the CSF of the selected thumbnail tile in progress and upscale the resultant image to the resolution of the primary bitstream. Block 902 is followed by block 904 where access to the primary bitstream at the next available access point takes place. In this case of FIG. 6A, RAP-ESPN is accessed. Block 904 is followed by block 906 where the primary bitstream is decoded at the primary bitstream resolution. During decoding, the device 304 will display the decoded program content of the primary bitstream 600-CH3 (FIG. 7).

Figure 10A:
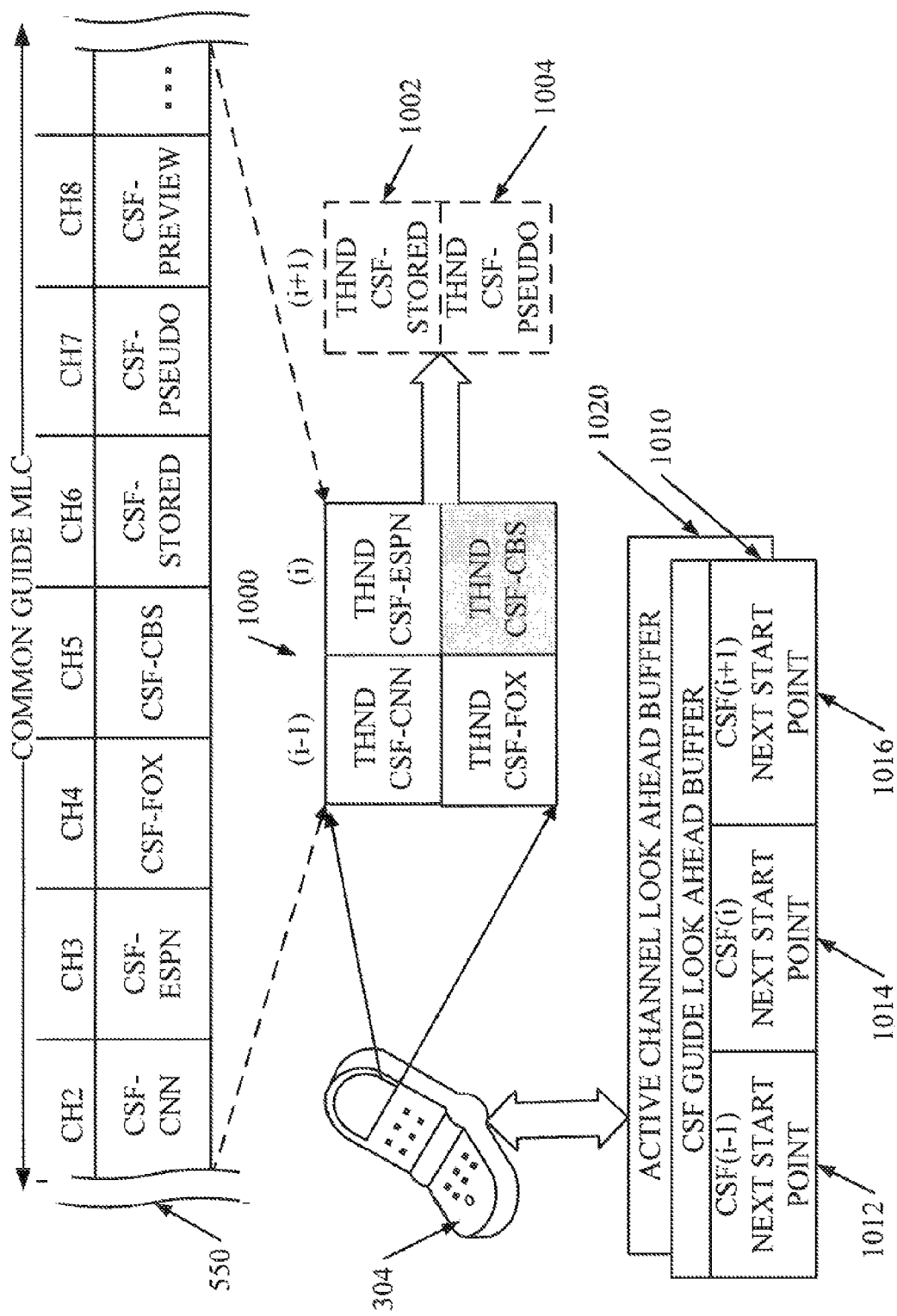
FIG. 10A illustrates a channel switch frame (CSF) guide look ahead buffer and an active channel look ahead buffer.

FIG. 10A illustrates a channel switch frame (CSF) guide look ahead buffer 1010 and an active channel look ahead buffer 1020. The active channels are generally accessed by the device 304 in guide order. This means that there is a high probability that the next channel to acquire is one of two choices. By placing the CSF in both the guide order in the CSF guide look ahead buffer 1010 and adjacent channels order in the active channel look ahead buffer 1020, it is possible to have the next second's start point this second. A specific gain to this approach is that the device 304 can be assured of some video for the next second independent of the time of the channel change key is pressed. The device 304 has to buffer the adjacent channels CSFs in order to achieve this effect. Another specific gain is to assure video for a next channel.

In FIG. 10A, the (CSF) guide look ahead buffer 1010 includes a plurality of buffer sections 1012, 1014, and 1016. The active channel look ahead buffer 1020 may be similar to the CSF guide look ahead buffer 1010. Hence no further discussion of the active channel look ahead buffer 1020 will be described.

In FIG. 10A, the arrow from the thumbnail guide display 1000 to the thumbnail tiles 1002 and 1004, shown in dashed lines, serves to indicate that the user is scrolling to an adjacent channel in guide order off of the thumbnail guide display 1000. The buffer section 1014 is for the current CSF denoted by CSF(i) for a current active channel in the guide order. In this example, the highlighted thumbnail tile for channel CH5 is denoted as THND CSF-CBS in column (i) and represents the current channel in guide order. The buffer section 1014 stores the data associated with the next start point CSF(i) for channel (i). The buffer section 1016 stores the data associated with the next start point CSF(i+1) for channel (i+1) where CSF(i+1) is the CSF for the next adjacent channel to the right in guide order. In this case, the next adjacent channel may be associated with channel CH-6 in the column denoted as (i+1).

In an alternate aspect, the next adjacent channel may be channel CH 7 if the orientation on the display is followed for the adjacent channel identification.

The buffer section 1012 stores the data associated with the next start point CSF(i−1) for channel (i−1) where CSF(i−1) is the CSF for the next adjacent channel to the left in guide order. In this case, the next adjacent channel is channel CH-4 in the column denoted as (i−1). The description above is for four (4) tiles and would depend on the number of tiles displayed at one instance and the arrangement. The buffer sections 1012, 1014 and 1016 may store more than one CSF. The stored CSF(i) may be multiple CSFs, one for each consecutively aligned next time interval T1, T2, T3, etc.

Figure 10B:
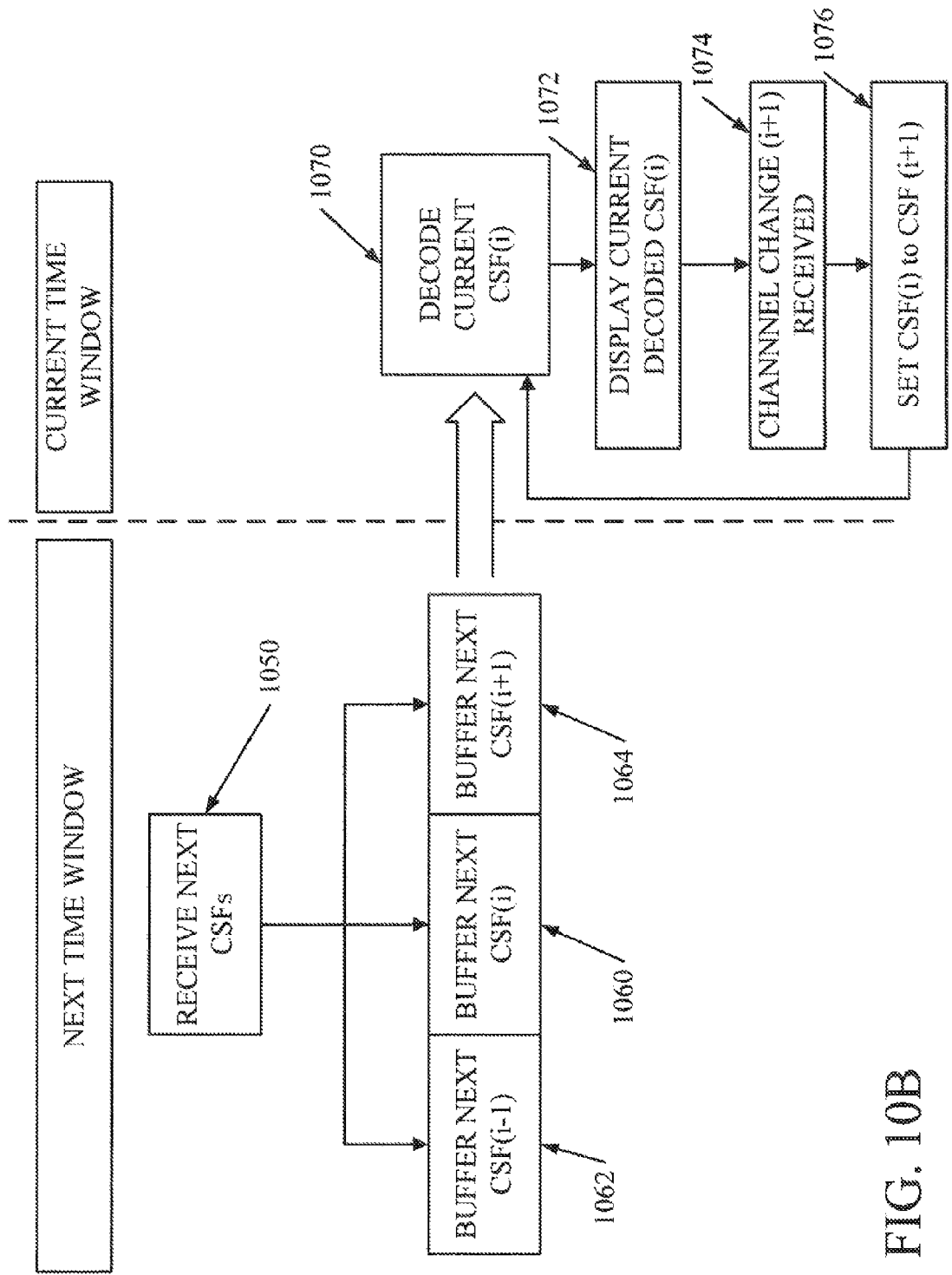
FIG. 10B illustrates a timing flow diagram for CSF receiving, buffering and decoding.

FIG. 10B illustrates a timing flow diagram for CSF receiving, buffering and decoding. In FIG. 10B, the flow diagram for a current time window includes decoding a current CSF(i) at block 1070. The current CSF(i) is for a current time interval for a current channel. Block 1070 is followed by block 1072 where the currently decoded CSF(i) is displayed. During the current time window, the device 304 is also receiving the next in time one or more CSFs at block 1050. While receiving and decoding may take place essentially simultaneously, the received CSF is for the next time window. Block 1050 is followed by blocks 1060, 1062 and 1064. At blocks 1060, 1062 and 1064, the received CSFs are buffered. Here, the received CSFs are buffered in guide order.

When the decoding block 1070 finishes decoding the CSF data, the video data is displayed and is spent or consumed during the current time window. As time advances to the next in time instance, the decoding operation needs to be feed the next in time buffered CSF(i). The next in time buffered CSF(i) becomes the current CSF(i) for decoding in the current time window.

Returning again to the current time window, in the case where the device 304 receives a channel change at block 1074, at any instant of time in the current time window, the decoding operation needs to start decoding the CSF for the current time window. Hence, the decoding operation immediately needs the next in time buffered CSF data for the selected channel (i+1).

Thus, block 1074 is followed by block 1076 where the CSF(i) in the current time window is set to the CSF(i+1). Thus, the decoding operation at block 1070 is essentially immediately feed the CSF(i+1) data from block 1064. The buffer sections (FIG. 10A) would be adjusted accordingly for the guide order arrangement in accordance with the new channel selection. In other words, CSF(i+1) becomes CSF(i) at block 1076.

Figure 11:
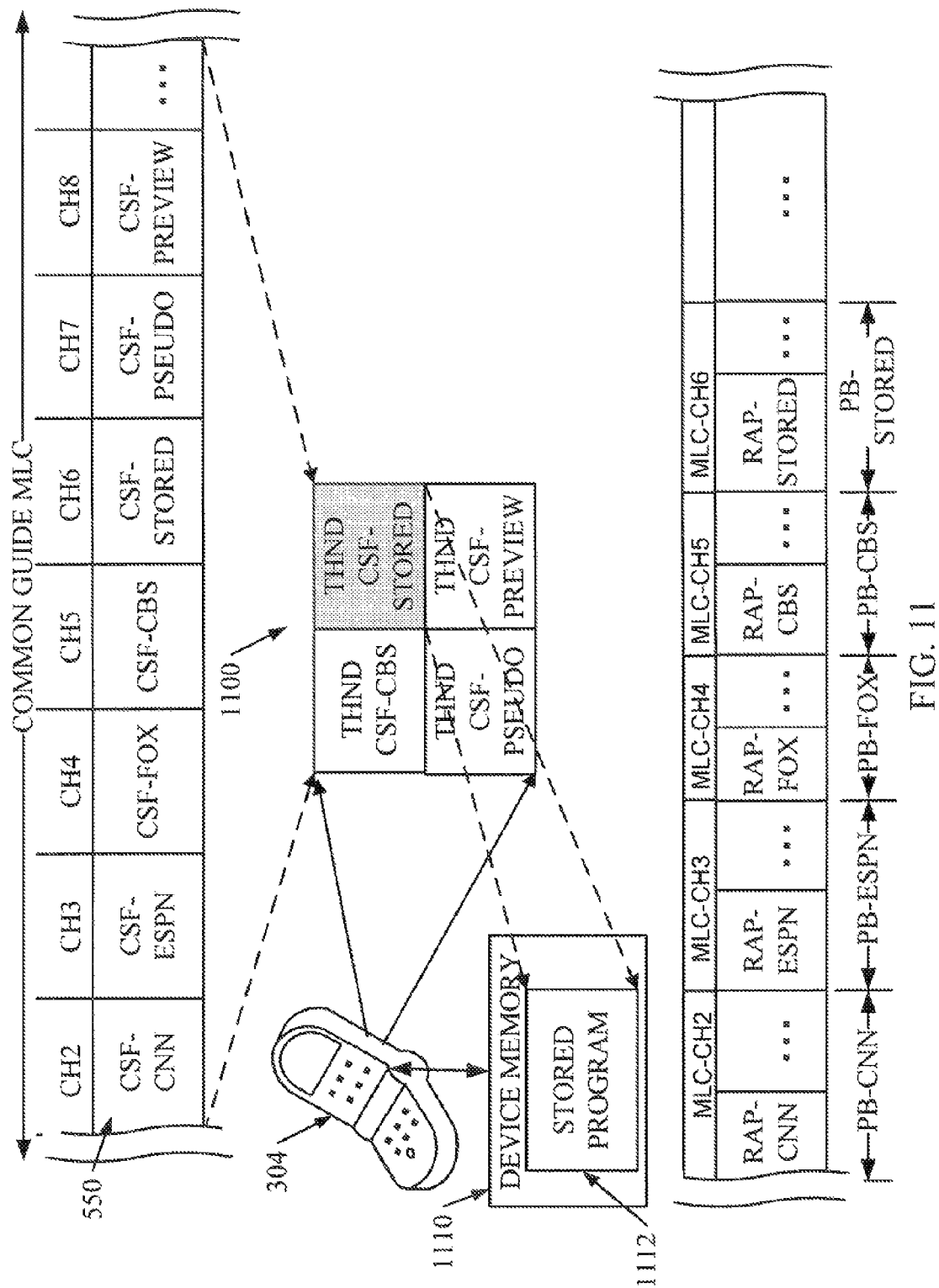
FIG. 11 illustrates a device switching from a guide thumbnail to a stored program.

FIG. 11 illustrates a device 304 switching from a guide thumbnail tile THND CSF-STORED to a stored program 1112 in device memory 1110. The device 304 may subscribe to a subscription package that allows for broadcast programs to be stored for future playback by the user at any time or during a predetermined timed window. In one example, the device 304 may automatically download sports highlights from the primary bitstream 600-CH6 when accessed, either manually or automatically. However, at any subsequent time, when the user selects the thumbnail tile THND CSF-STORED being displayed on the thumbnail guide display 1100, if the sports highlights have been previously stored, the decoder 160 will automatically switch to the stored program 1112 in the device memory 1110. In this instance, the primary bitstream 600-CH6 need not be accessed unless, the stored program is being updated or another one is being automatically or selectively stored in the device memory 1110.

Figure 12:
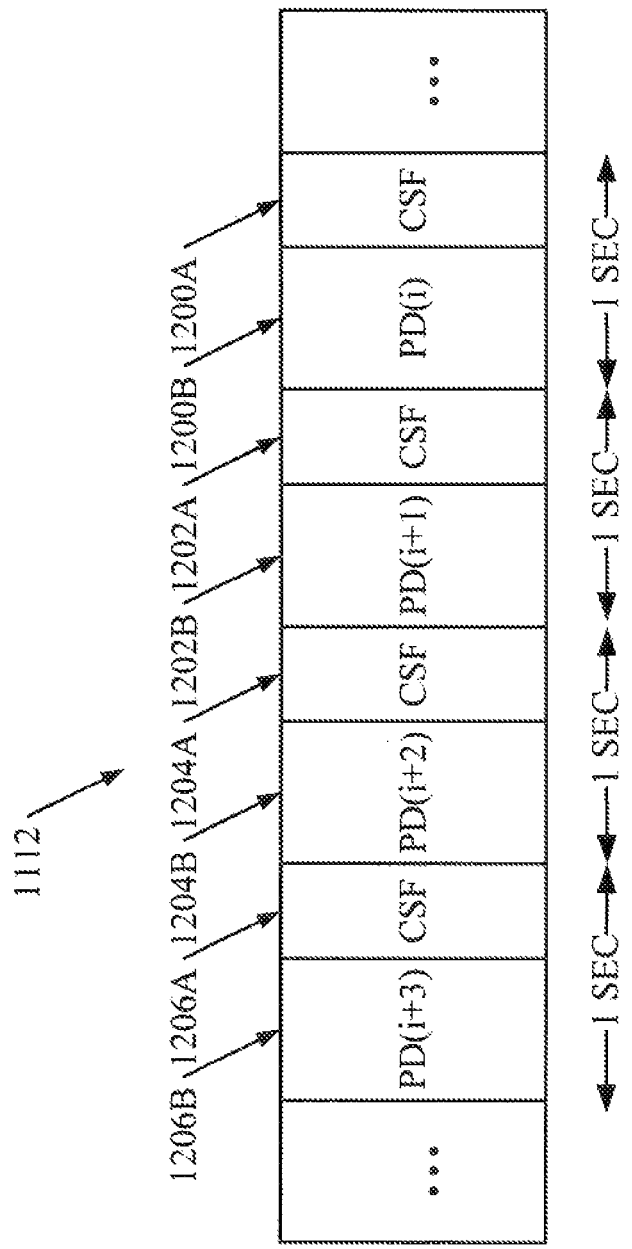
FIG. 12 illustrates a stored program primary bitstream with very fast forward processing.

FIG. 12 illustrates a stored program 1112 primary bitstream with very fast forward processing. When the CSF is applied, for example, in a stored video file, the CSF can be used as a simple faster forward mechanism. In particular, a fast forward operation via playback of only I-frames and P-frames have rate limitations. The possible adaptive GOP structure makes use of I-frames only unrealistic due to the highly nonlinear time. The CSF can be, by its nature, periodic and possibly at 1 frame per second so a very fast forward operation (e.g. 30x) is possible. This provide a very fast forward operation (and all other speeds in between), and potentially inherently in linear time.

An exemplary primary bitstream for a stored program 1112 may include a CSF 1200A followed by program data PD(i) 1200B where i represent a current time interval. The CSFs 1200A, 1202B, 1204A and 1206A repeated every 1 second. Between the CSFs 1200A, 1202B, 1204A and 1206A are PD(i) 1200B, PD(i+1) 1202B, PD(i+2) 1204B and PD(i+3) 1206B. While, one second intervals are shown, other increments of time may be substituted. The CSFs may provide a point of access. The more CSFs the more rapid a pace for fast forwarding. In general, the CSF may be 20% the size of an I-frame used for access. Thus, a plurality of CSFs may be substituted for a single I-frame.

Figure 13:
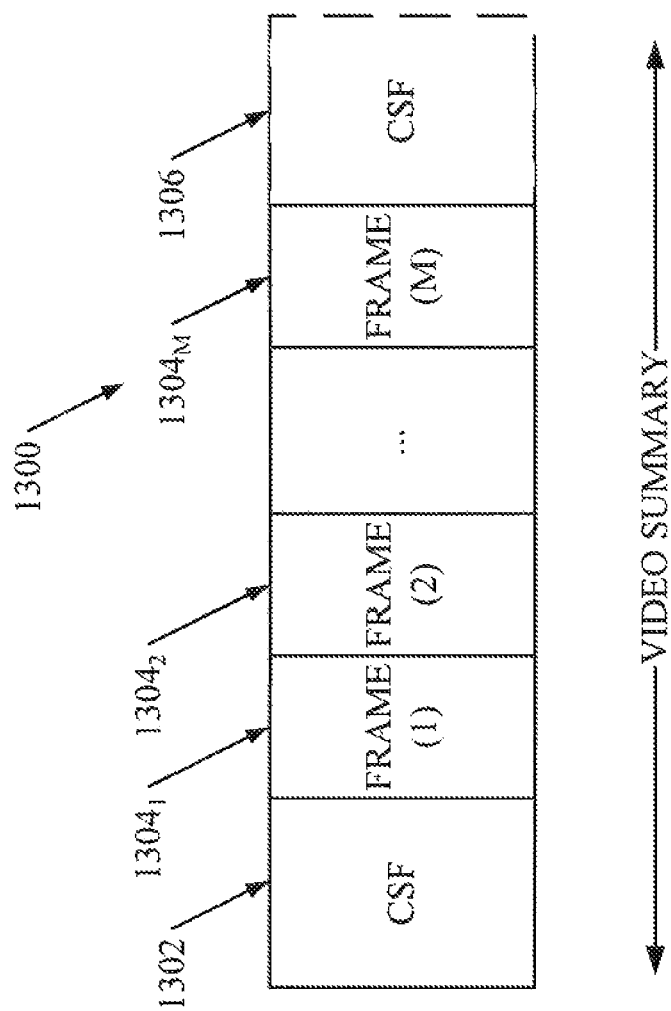
FIG. 13 illustrates a block diagram of a video summary.

FIG. 13 illustrates a block diagram of a video summary 1300. The video summary 1300 is a packet and has several applications (e.g. video indexing) as will become evident from the description provided herein. The video summary 1300 can be generated using just the CSFs 1302, 1306 (and potentially, as desired, a few additional M frames 1304₁, 1304₂, . . . , 1304_M that follow in decode order). Additionally, CSFs 1302, 1306 can serve as a periodic index (or glance) into the content on any given channel and also enable searching. This is typically applied to (but not restricted to) stored program 1112 or in pseudo-streaming video where video data is buffered before playback.

The video summary 1300 can also be generated using transitional effects such as cross fades, for example, M number of frames may be generated between two CSFs 1302 and 1306 as their linear combination may be using alpha blending techniques. Additionally, this mechanism also can be used when switching between two (2) channels in mobile TV applications. The video summary 1300 may be stored for a plurality of active channels to supply a video index.

Figure 20:
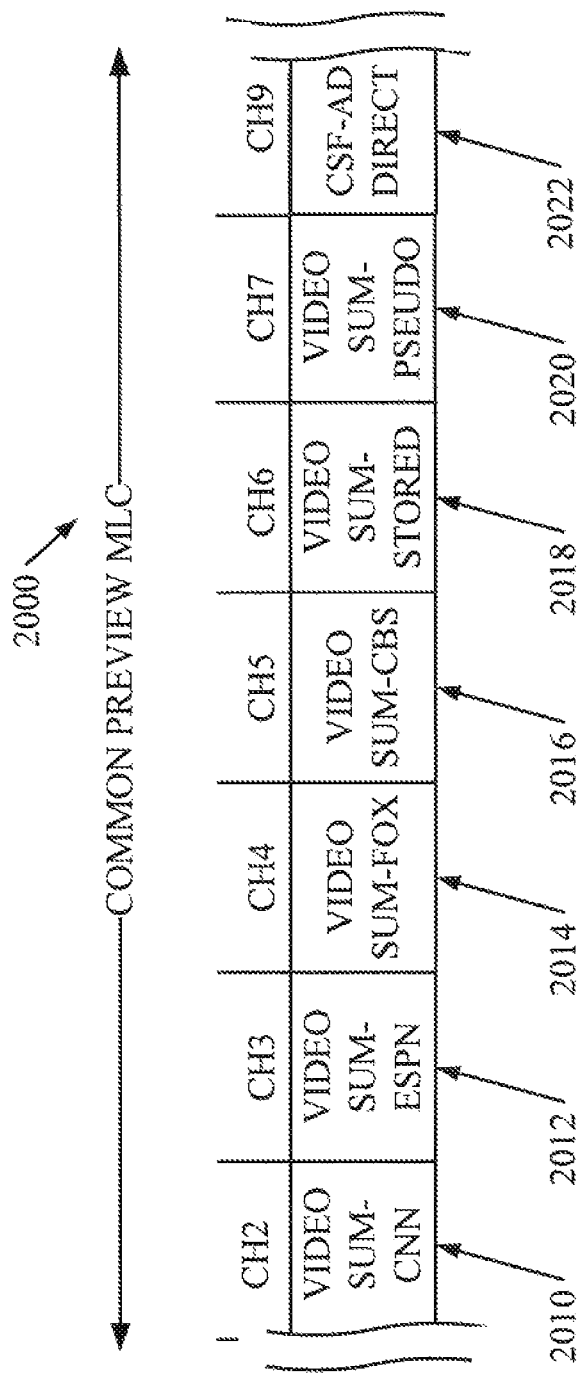
FIG. 20 illustrates a common preview MLC.

The video summary 1300 may be used for channel CH8. In this example, in preview mode (selected by the thumbnail tile THND CSF-PREVIEW of FIG. 11) the common guide MLC 550 would provide the video summary 1300 without the need for accessing any primary bitstream or alternately access a common preview MLC 2000 (FIG. 20). The video summary 1300 would provide just enough video content for a snippet (brief video clip) to allow the user to preview program content. The video summary may be used in other instances such as a video clip teaser.

FIG. 20 illustrates a common preview MLC 2000. In one aspect, the common preview MLC 2000 includes at least one video summary 2010, 2012, 2014, 2016, 2018, and 2020 for a plurality of active channels CH2, CH3, CH4, CH5, CH6, and CH7, respectively. An exemplary video summary for each active channel CH2, CH3, CH4, CH5, CH6, and CH7 is shown in FIG. 13. In one aspect, the video summaries in the common preview MLC 2000 may be displayed in a similar manner as described in relation to the common guide MLC 550. Furthermore, selection of one of the displayed video summaries or entry of a channel number may provide direct entry to the primary bitstream.

In another aspect of the common preview MLC 2000, an ad insertion location directory CSF 2022 may be included. In this example, the ad insertion location directory CSF 2022 is associated with channel CH9.

Figure 14:
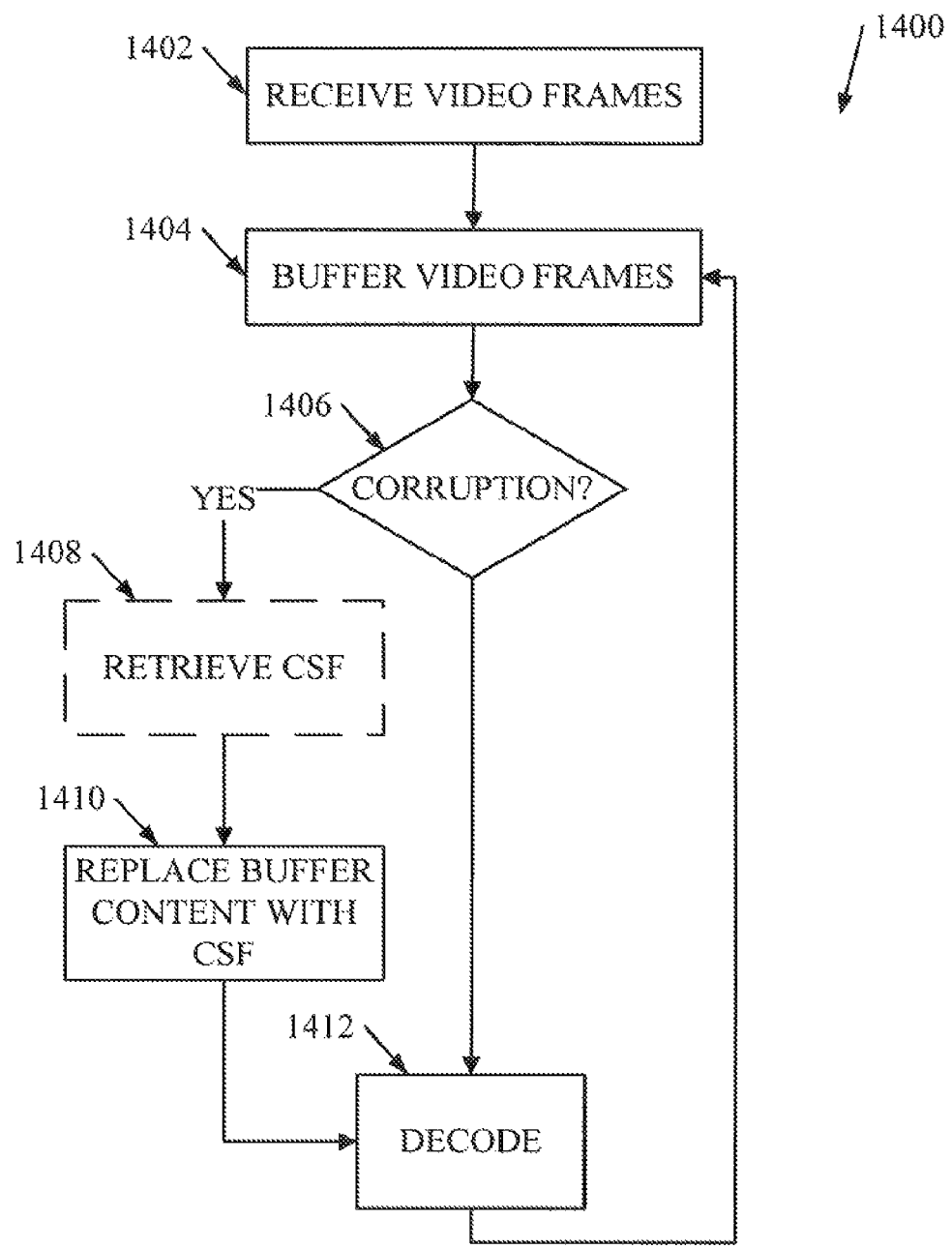
FIG. 14 illustrates a flowchart of a process for corrupted buffer replacement using CSFs.

FIG. 14 illustrates a flowchart of a process 1400 for corrupted buffer replacement with CSFs. The CSF is nominal data that when provided to a video buffer (such as buffer 1010) allows start up of the decoder 160. In the case of buffer corruption due to one or more dropped P or I frames from the primary bitstream, the CSF in buffer 1010 may be used as a replacement for the corrupted buffer content. One advantage is that errors with a long latency (in terms of error propagation) can be flushed more quickly. In replacing predicted pictures, the decoder 160 may scale the motion vectors for the appropriate temporal location. Optionally, the encoder device 110 may facilitate appropriate prediction from the CSF to avoid or minimize drift artifacts.

The process 1400 begins with block 1402 where the video frames from the primary bitstream are received. Block 1402 is followed by block 1404 where the video frames from the primary bitstream are buffered. Block 1404 is followed by block 1406 where a determination is made whether the buffer's data is corrupted. If the determination at block 1406 is "NO," the video frames are decoded at block 1412. However, if the determination at block 1406 is "YES," then block 1406 is followed by block 1408 where the buffered CSFs are retrieved. Block 1408 is followed by block 1410 where the buffer contents of video frames is replaced with at least one CSF associated with the channel. Block 1410 is followed by block 1412 where the at least one CSF is decoded.

Returning again to FIG. 5, in one aspect, if commercial free viewing is desired, a CSF for an active channel in the common guide MLC 550 is not provided during commercials and the presence of a commercial can be detected by this or other means. Thus, the CSFs, in one aspect, include programming content other than commercials. Thus, during playback, switching can occur within the same channel from one program segment to the next (this is possible when there is sufficient buffering of data before decode and playback).

In tiled view or preview mode, the user can choose not to join a channel if a commercial is observed to be playing on the desired channel. Alternatively, no acquisition of CSF is triggered during commercials.

Figure 15:
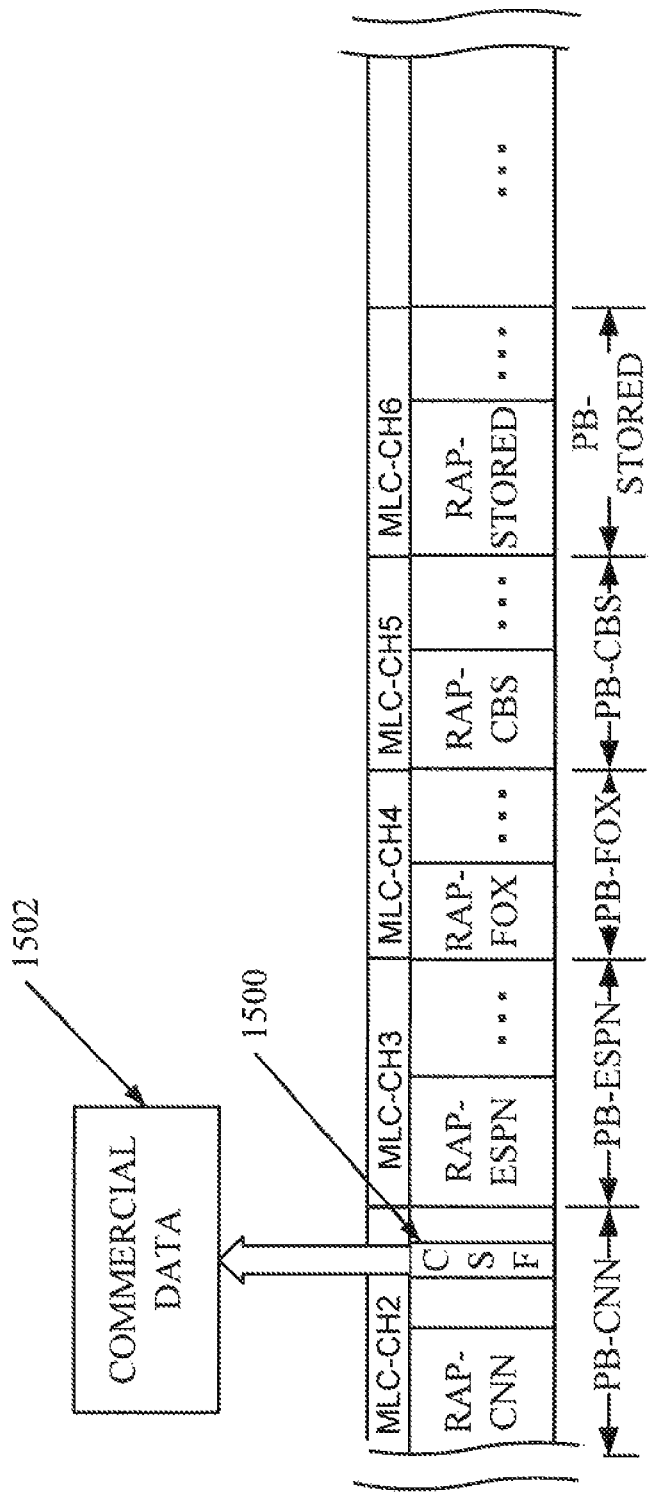
FIG. 15 illustrates a CSF as a splice point to introduce commercials.

FIG. 15 illustrates a CSF 1500 as a splice point or splicing mechanism to introduce commercials in the midst of regular programming broadcast on the primary bitstream. Additionally, a CSF can be used for forced viewing of commercials or teasers or video for other marketing applications. Thus, the CSF is a tool to enable flexible viewing for commercials. The CSF 1500 would include information related to commercial data 1502.

Figure 17A:
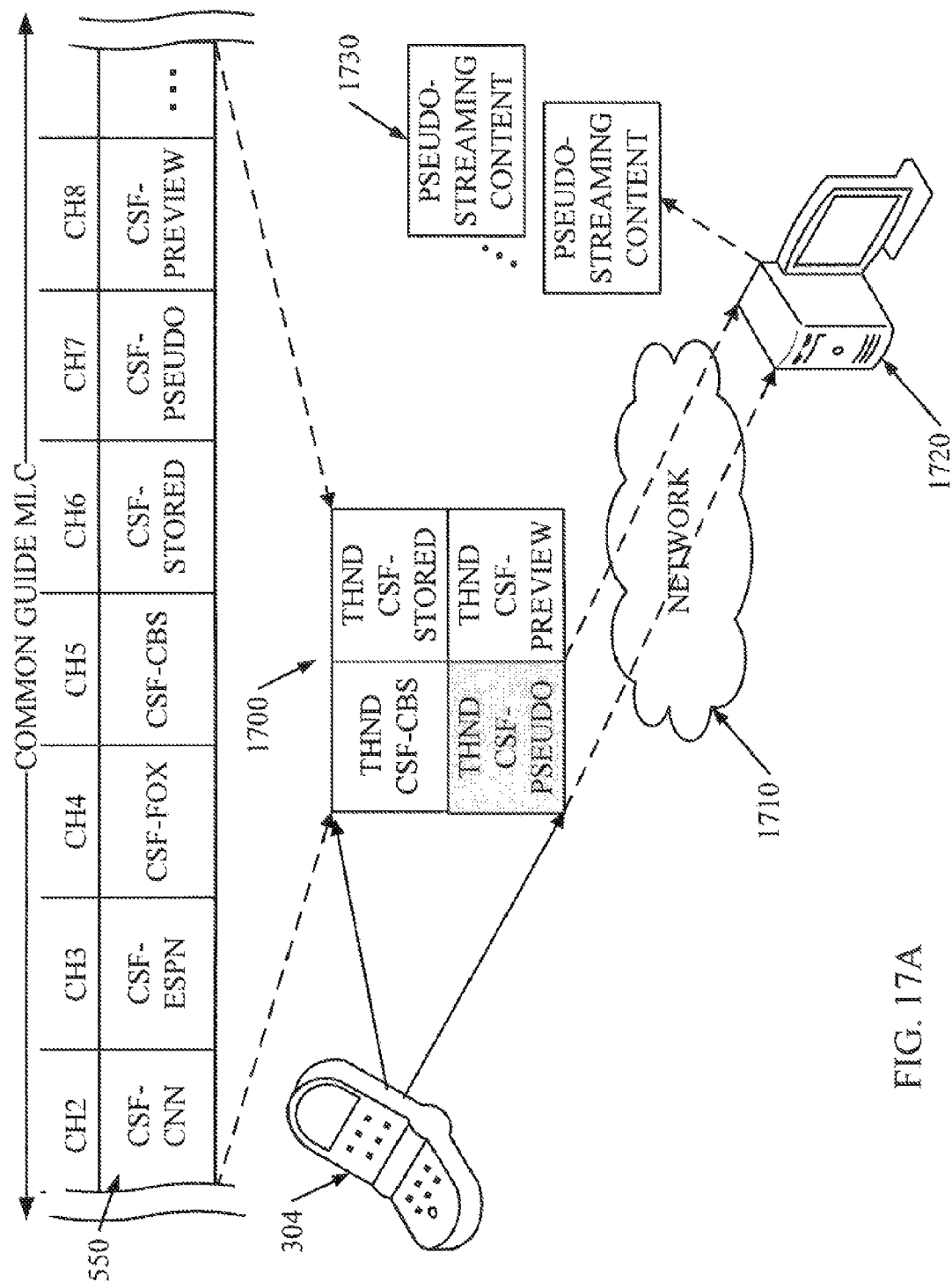
FIG. 17A illustrates direct entry to pseudo-streaming content.

FIG. 17A illustrates direct entry to pseudo-streaming content 1730. Pseudo-streaming may be a combination of continuous buffering and playback. If the user selects the THND for CSF-PSEUDO (shown highlighted) the thumbnail guide display 1700, a link may be embedded therein for direct entry to a remote pseudo-streaming server 1720 via network 1710. The remote pseudo-streaming server 1720 provides access to a respective one or more files associated with pseudo-streaming content 1730 in accordance with the link. The device 304, after selecting the THND CSF-PSEUDO, begins buffering the pseudo-streaming content 1730 followed by playback via server 1720 through the network.

Figure 17B:
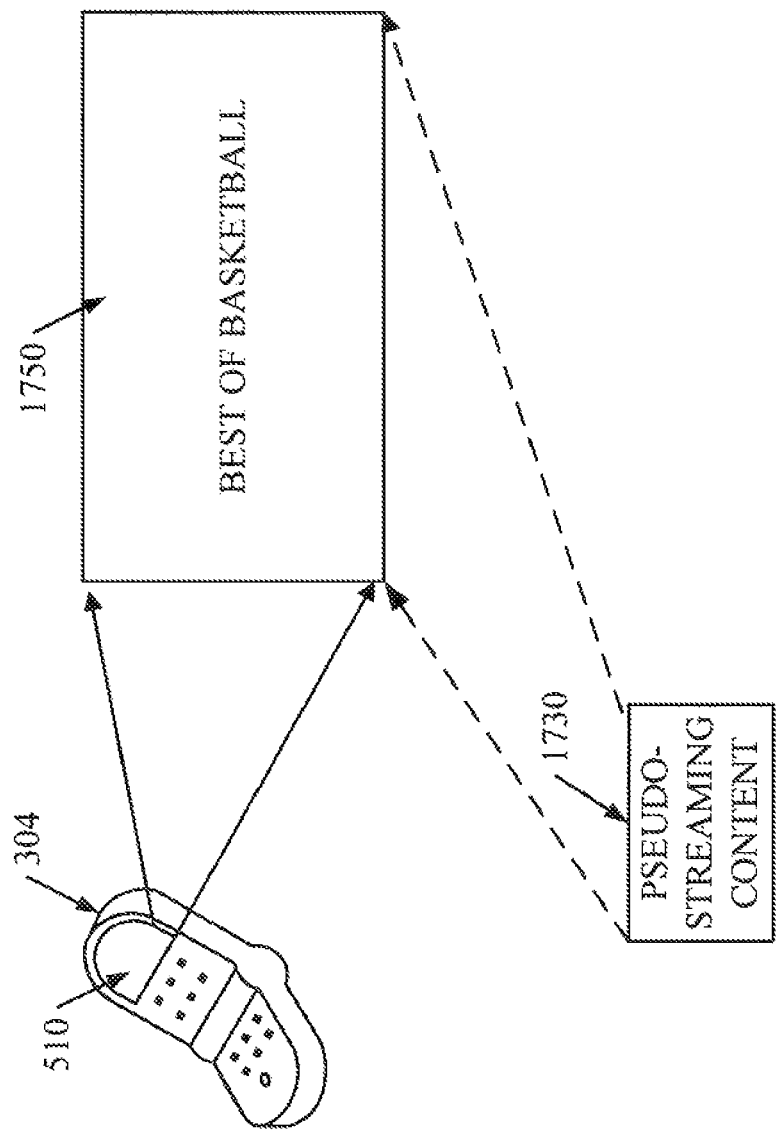
FIG. 17B illustrates the pseudo-streaming content being displayed.

FIG. 17B illustrates the pseudo-streaming content 1730 being displayed on display 1750 via a playback operation.

The CSF is a flexible tool to provide layered rate balancing. In this application, the location of the channel switch frame (CSF) may be adjusted between the base and enhancement layers of a layered codec system. This provides a simple mechanism to change the data rate balance between the two layers. One or many specific gains for this technique is that it is very simple to implement and the enhancement rate balance reduces the overall network capacity required to carry a specific channel, which then reduces power consumption. The CSF size may be adapted to the available space (e.g., by means of quantization). The base layer size and enhancement layer size are application layer constrained.

Figure 18:
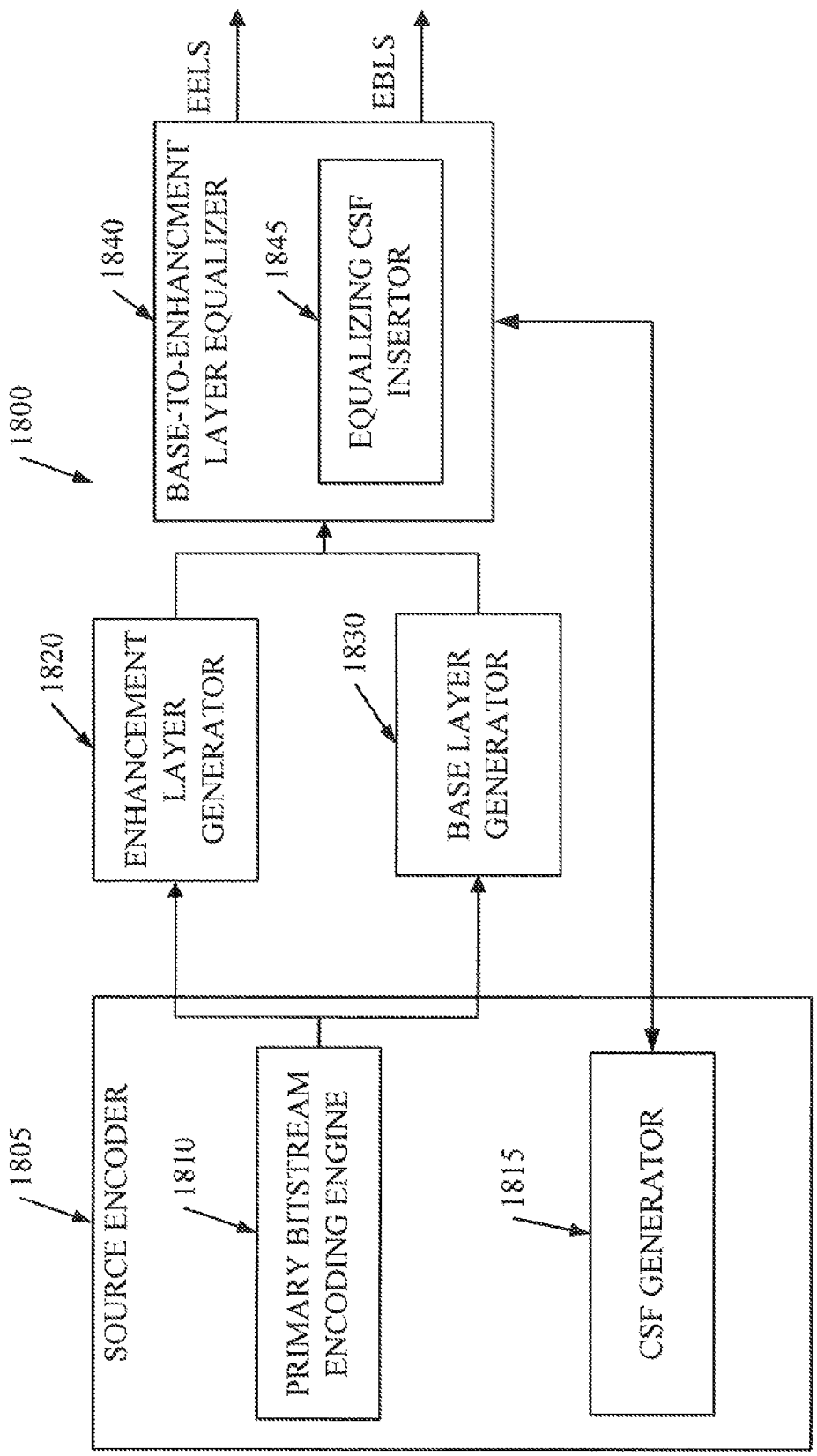
FIG. 18 illustrates a portion of an encoder device with base layer to enhancement layer balancing.

FIG. 18 illustrates a portion of encoder device 1800 with base layer to enhancement layer balancing. The encoder device 1800 includes a source encoder 1805 similar to the source encoder 316 in FIG. 3. The source encoder 1805 includes a primary bitstream encoding engine 1810 to encode and generate a primary bitstream. The source encoder 1805 also includes a CSF generator 1815 to generate a CSF. The output of the primary bitstream encoding engine 1810 is sent to an enhancement layer generator 1820 and to a base layer generator 1830 shown in parallel. The output of the enhancement layer generator 1820 produces an enhancement layer signal with an enhancement layer size (ELS). The base layer generator 1830 outputs a base layer signal with a base layer size (BLS). The outputs from the enhancement layer generator 1820 and the base layer generator 1830 are sent to a base-to-enhancement layer equalizer 1840 to equalize the enhancement layer-to-base layer ratio.

The base-to-enhancement layer equalizer 1840 includes an equalizing CSF insertor 1845 which generates a variable CSF via CSF generator 1815 to equalize the enhancement layer-to-base layer ratio. The CSF may be varied such as by quantization to equalize the BLS to the ELS within some margin.

Figure 19:
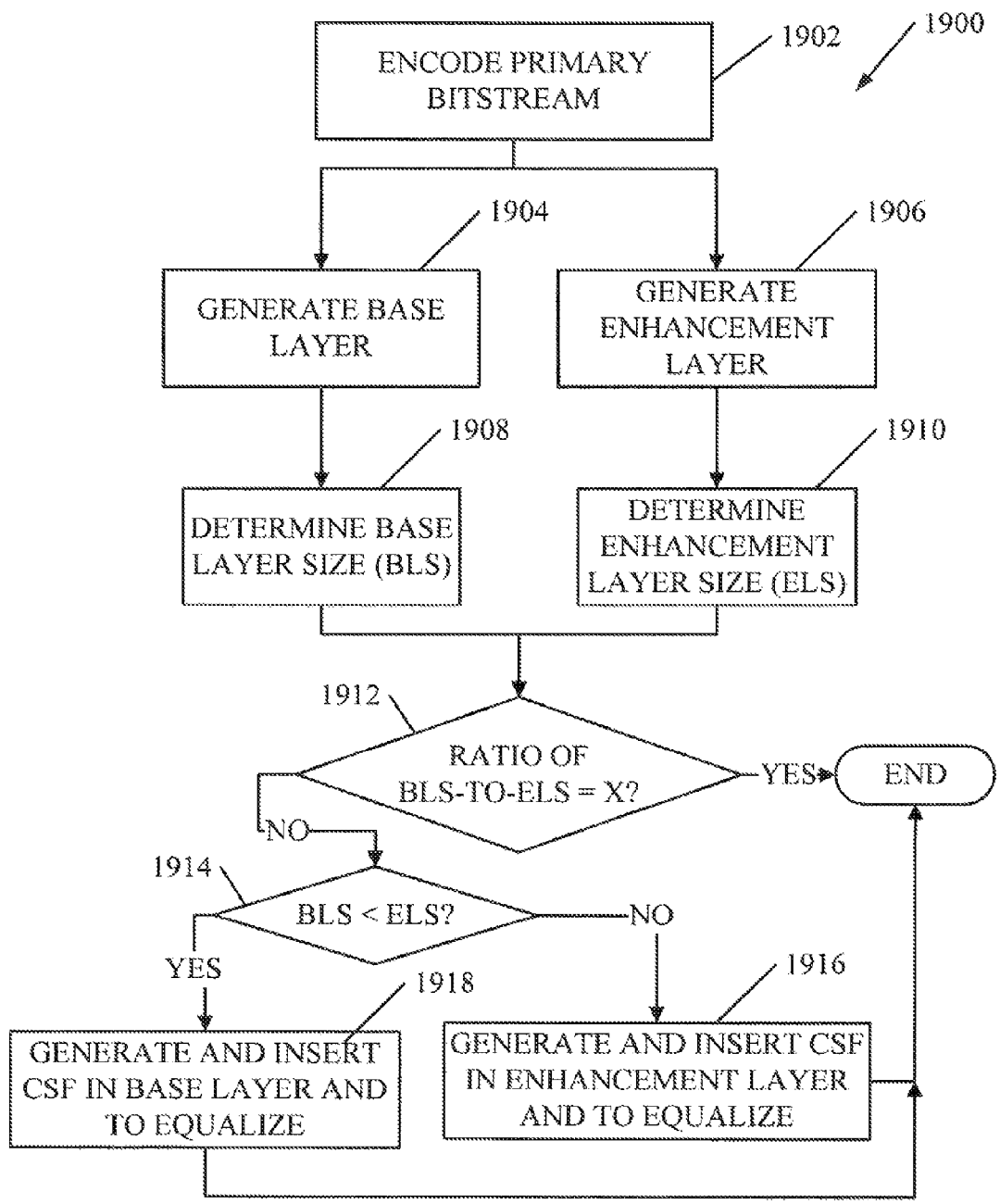
FIG. 19 illustrates a flowchart of a process for base layer-to-enhancement layer balancing.

FIG. 19 illustrates a flowchart of a process 1900 for base layer-to-enhancement layer balancing. The process 1900 begins with block 1902 where the primary bitstream is encoded. Block 1902 is followed by block 1904 and 1906. At block 1904, the base layer is generated. At block 1906, the enhancement layer is generated. Block 1904 is followed by block 1908 where the BLS is determined. Block 1906 is followed by block 1910 where the ELS is determined. Block 1908 and 1910 are followed by block 1912, where a determination is made whether the ratio of BLS-to-ELS is equal to some preset ratio (X). For example, the preset ratio (X) may be 1 or some other number. In the exemplary embodiment, the term equal represents the ratio within some marginally difference. If at block 1912 the determination is "YES," the process 1900 ends. However, if the determination is "NO," block 1912 is followed by block 1914 where a determination is made whether the BLS is less than the ELS as a function of the preset ratio. If the determination is "NO," at block 1914, block 1914 is followed by block 1916. At block 1916, a CSF is generated and inserted into the enhancement layer so that the ELS is equalized to the base and enhancement layer sizes as a function of the preset ratio.

If the determination at block 1914 is "YES," then the CSF is generated and inserted into the base layer so that the BLS is equalized to the base and enhancement layer sizes as a function of the preset ratio.

Additionally, the CSF may be partitioned into base and enhancement components (e.g. signal-to-noise ratio (SNR) scalable CSF) to achieve balance (equalization) on a finer level. The size of base and enhancement components can be varied to adapt to space available for a target bandwidth ratio between base and enhancement layers. This ratio may be dictated by, for example, the physical layer energy ratios.

Yet another aspect of this application is when the CSF can be coded such that it enhances the quality of the corresponding base layer frame. This is of particular benefit when the enhancement layer is lost or not transmitted or received based on the system bandwidth or transmission channel error conditions. This is different from straight SNR scalability in that the CSF is independently decodable with the combination of the corresponding P- and/or B-frame(s).

In an H.264 video stream, the CSF may be placed arbitrarily to provide regular access points, i.e., temporal locations where access to the video stream is desirable, such as shown in FIG. 12. It is possible to further optimize this process by evaluating the potential locations for access. For example, a P frame within an H.264 stream may contain both I and P data. If it is observed that a specific P frame contains a large amount of I data as in, for example, a partial scene change (optionally a bias toward intra can be applied during mode decision), the associated CSF required to join the stream at this point may be quite small. By evaluating the residual data size required to join the stream at all or some of the possible locations it is possible to reduce the required CSF size. Some of the specific gains of this application includes a reduced data rate, and as a result, lower power consumption. Thus, the CSFs provides a flexible tool for opportunistic injection of switch frame locations in a myriad of instances.

The CSF itself could be coded as an Intra, P or B frame. Alternatively, the CSF could be coded such that the transform (and quantized) coefficients of the CSF data may be hidden in the transform domain coefficients of the corresponding base and/or enhancement layer(s) data (and/or the corresponding single layer data) effectively before entropy coding to minimize compression overhead of entropy coding two different streams of coefficients separately.

In the case where CSF augments the primary data for a channel, only the difference information need be coded in the primary data. The remaining information can be extracted from the CSF. For example, when CSF is to be located at the temporal location of a P-picture, then code this P-frame as one where mode decision is biased towards intra (thus increasing the probability of intra macroblocks). The remaining inter macroblocks are coded in the P-frame and the intra macroblocks are sent in the CSF. The CSF can also be coded as a P-frame.

The CSF provides a flexible tool that has error robustness. When transmission errors contaminate the primary data pertaining to a channel, the decoder 160 can force a channel change to the same channel thus invoking the CSF. The CSF by virtue of its location (in the same or separate guide MLC 550) and temporal distance may provide the diversity (temporal and/or frequency and/or spatial and/or code, as in code block) required to protect it from the same errors that contaminated the primary data. Hence recovery from errors can be facilitated using CSFs. Partial recovery in the case of random errors is also possible wherein the intra data in the CSF can be used to recover lost macroblocks in the corresponding predicted frame (P or B) through spatial or temporal concealment methods.

In FIG. 10A, the (CSF) guide look ahead buffer 1010 stores CSFs in guide order while the active channel look ahead buffer 1020 stores CSF in active channel order. The active channel order may not be the same order as the guide order and/or may be displaced in time. Thus, a forced channel change, when invoked, could replace the user initiated channel change at block 1074. The decoder 160 can force a channel change to the same channel (i) thus invoking the CSF(i) from the buffer 1060.

The CSF is more effective than existing methods, for example, redundant coded picture or SI and SP pictures in H.264, since CSF can be encapsulated in a separate transport packet (or exposed to one or more OSI layers or encapsulation layers in the protocol stack). Such isolation provides the flexibility needed for acquisition applications (some of which are described in this document) and for error recovery purposes in terms of the diversity or separation (some of which are described in this document). Redundant coded picture is associated with a picture and tagged with the encoded frame and coexists with the coded data for the picture.

For error resilience, CSF can be coded based on which blocks are not intra-refreshed in the CSF (i.e., choose to refresh more important blocks, e.g. those that are referenced by most future macroblocks).

The CSF is a flexible tool to accommodate decoders with different capabilities. In broadcast or multicast applications, devices 304 with varied capabilities (in terms of computation, processor, display, power limitations etc) exist in the system. The network or server transmits a signal that is typically of the latest version that is backward compatible with older versions of the decoder devices 150. The CSF can be used to provide such backward compatibility (to accommodate a variety of decoders in general), where decoders that are starved of computational power can decode the CSF instead of the corresponding full blown (in terms of quality, size or resolution) coded reference picture.

In one aspect, the CSF sent in the common guide MLC 550 of FIG. 6A may be a versionless CSF. The versionless CSF would be able to be decoded by any current device 304 and any predecessors. In another example, the predecessors may only be able to decode the video summary of a channel using the versionless CSFs.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm blocks described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks of a process, method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

What is claimed is:

1. A system comprising:
an encoder operative to generate a common guide media logical channel (MLC) including a plurality of channel switch frames (CSFs), each respective active channel is associated with a respective one or more CSFs and has a different bitstream resolution than the respective one or more CSFs, wherein the MLC includes a separate CSF for direct entry to a stored channel, and wherein the stored channel comprises a broadcast program stored for future playback; and
a decoder implemented by a processor and operative to decode a set of the plurality of CSFs, simultaneously display programming content of the decoded set of the plurality of CSFs on a display, acquire and decode a bitstream of the active channel associated with one of the set of the plurality of CSFs in response to a selection of the displayed programming content of the one of the set of the plurality of CSFs.

2. The system of claim 1, wherein the decoder automatically switches to a primary bitstream of an active channel associated with a selected one displayed CSF.

3. The system of claim 2, wherein the primary bitstream has a first resolution and the plurality of CSFs has a second resolution.

4. The system of claim 3, wherein the set of the plurality of CSFs comprises N CSFs and the decoder is operative to reduce the second resolution of a CSF by 1/N.

5. The system of claim 4, wherein the decoder is operative to display the N CSFs in N guide thumbnail tiles simultaneously; and the primary bitstream of the active channel is entered upon selection of a thumbnail tile associated with the selected one CSF.

6. The system of claim 2, wherein the decoder is operative to buffer at least one CSF of a current channel, to determine whether contents from the primary bitstream is corrupted in a video buffer, and to replace the contents of the video buffer with the at least one CSF of the current channel.

7. The system of claim 1, wherein the CSF is free of commercial content.

8. The system of claim 1, wherein the common guide MLC includes a CSF for each active channel in the system.

9. The system of claim 1, wherein the common guide MLC further comprises a video summary, the video summary comprises a packet with at least one CSF with M frames in decode order for a respective active channel.

10. The system of claim 9, wherein the video summary is inserted in a preview channel interval in the common guide MLC.

11. The system of claim 1, wherein the decoder comprises a guide look ahead buffer and is operative to store at least one CSF for a next start point for a current channel and at least one CSF for a next start point for an adjacent channel to the current channel in the guide look ahead buffer.

12. The system according to claim 1, wherein the decoder is a portion of a cellular phone, wireless device, wireless communications device, a video game console, a wirelessly-equipped personal digital assistant (PDA), a laptop computer, or a video-enabled device.

13. A device comprising:
a decoder operative to:
decode programming content of a set of channel switch frames (CSFs) from a plurality of CSFs in a common guide media logical channel (MLC) each respective active channel is associated with a respective one or more CSFs and has a different bitstream resolution than the respective one or more CSFs, simultaneously display on a display screen programming content of the decoded set of CSFs, and acquire and decode a bitstream of the active channel associated with one of the set of the plurality of CSFs upon selection of the displayed programming content of the one of the set of the plurality of CSFs, wherein the MLC includes a separate CSF for direct entry to a stored channel, and wherein the stored channel comprises a broadcast program stored for future playback; and
a memory coupled to the decoder.

14. The device of claim 13, wherein the decoder automatically switches to a primary bitstream of an active channel associated with a selected one displayed CSF.

15. The device of claim 14, wherein the primary bitstream has a first resolution and the set of CSFs has a second resolution, the first resolution is greater than the second resolution.

16. The device of claim 15, wherein the set of the plurality of CSFs comprises N CSFs and the decoder is operative to reduce the second resolution of a CSF by 1/N.

17. The device of claim 16, wherein the decoder is operative to display the N CSFs in N guide thumbnail tiles; and the primary bitstream of the active channel is entered upon selection of a thumbnail tile associated with the selected one CSF.

18. The device of claim 13, wherein the set of CSFs is free of commercial content.

19. The device of claim 13, wherein the common guide MLC includes a CSF for each active channel of a subscription package for a video or mobile television system.

20. The device of claim 13, wherein the common guide MLC further comprises a video summary, the video summary comprises a packet with a CSF with M frames in decode order for a respective active channel.

21. The device of claim 20, wherein the video summary is inserted in a preview channel interval in the common guide MLC.

22. The device according to claim 13, wherein the decoder is a portion of a cellular phone, wireless device, wireless communications device, a video game console, a wirelessly-equipped personal digital assistant (PDA), a laptop computer, or a video-enabled device.

23. An integrated circuit comprising:
a processor operative to implement a set of instructions to decode programming content of a set of a plurality of channel switch frames (CSF) from a common guide media logical channel (MLC) each respective active channel is associated with a respective one or more CSFs and has a different bitstream resolution than the respective one or more CSFs, display simultaneously on a display screen programming content of the decoded set of the plurality of CSFs, and acquire and decode a bitstream of the active channel associated with one of the set of the plurality of CSFs in response to a selection of the one of the set of the plurality of CSFs, wherein the MLC includes a separate CSF for direct entry to a stored channel, and wherein the stored channel comprises a broadcast program stored for future playback; and
a memory coupled to the processor.

24. The integrated circuit of 23, wherein the processor automatically switches to a primary bitstream of an active channel associated with a selected one displayed CSF.

25. The integrated circuit of claim 24, wherein the primary bitstream has a first resolution and the set of the plurality of CSFs has a second resolution, the first resolution is greater than the second resolution.

26. The integrated circuit of claim 25, wherein the set of the plurality of CSFs comprises N CSFs and the processor is operative to reduce the second resolution of a CSF by 1/N.

27. The integrated circuit of claim 26, wherein the processor is operative to display the N CSFs in N guide thumbnail tiles wherein the selected one CSF is selected from a thumbnail tile associated with the selected on CSF.

28. The integrated circuit of claim 25, wherein the common guide MLC includes a CSF for each active channel of a subscription package for a video or mobile television system.

29. The integrated circuit of claim 23, wherein the set of the plurality of CSFs is free of commercial content.

30. The integrated circuit of claim 23, wherein the common guide MLC further comprises a video summary, the video summary comprises a CSF with M frames in decode order for a respective active channel.

31. The integrated circuit of claim 30, wherein the video summary is inserted in a preview channel interval in the common guide MLC.

32. An apparatus comprising:
means for decoding programming content of a set of a plurality of channel switch frames (CSFs) from a common guide media logical channel (MLC) each respective active channel is associated with a respective one or more CSFs and has a different bitstream resolution than the respective one or more CSFs, wherein the MLC includes a separate CSF for direct entry to a stored channel, and wherein the stored channel comprises a broadcast program stored for future playback;
means for displaying simultaneously on a display screen the programming content of the set of the plurality of CSFs; and
means for acquiring each respective one active channel upon selection of the respective one or more CSFs associated with each respective one active channel.

33. The apparatus of claim 32, further comprising means for automatically switching to a primary bitstream of an active channel associated with a selected one displayed CSF.

34. The apparatus of claim 33, wherein the primary bitstream has a first resolution and the set of the plurality of CSFs has a second resolution, the first resolution is greater than the second resolution.

35. The apparatus of claim 34, wherein the set of the plurality of CSFs comprises N CSFs and the means for decoding include means for reducing the second resolution of a CSF by 1/N.

36. The apparatus of claim 35, wherein the means for displaying includes means for displaying the N CSFs simultaneously in N guide thumbnail tiles wherein the selected one CSF is selected from a thumbnail tile associated with the selected one CSF.

37. The apparatus of claim 32, wherein the set of the plurality of CSFs is free of commercial content.

38. The apparatus of claim 32, wherein the means for decoding include means for decoding a video summary in a preview channel in the common guide MLC.

39. A computer program product including a non-transitory computer readable medium having instructions for causing a computer to:
   decode programming content of a set of plurality of channel switch frames (CSFs) from a common guide media logical channel (MLC) each respective active channel is associated with a respective one or more CSFs and has a different bitstream resolution than the respective one or more CSFs, wherein the MLC includes a separate CSF for direct entry to a stored channel, and wherein the stored channel comprises a broadcast program stored for future playback;
   display simultaneously on a display screen content of the decoded set of the plurality of CSFs; and
   acquire and decode a bitstream of the active channel associated with one of the set of the plurality of CSFs in response to a selection of the displayed content of the one of the set of the plurality of CSFs.

40. The computer program product including a non-transitory computer readable medium of claim 39, further having instructions for causing the computer to automatically switch to a primary bitstream of an active channel associated with a selected one displayed CSF.

41. The computer program product including a non-transitory computer readable medium of claim 40, wherein the primary bitstream has a first resolution and the set of the plurality of CSFs has a second resolution, the first resolution is greater than the second resolution.

42. The computer program product including a non-transitory computer readable medium of claim 41, wherein the plurality of CSFs comprises N CSFs and the instructions to decode further includes instructions to reduce the second resolution of a CSF by 1/N.

43. The computer program product including a non-transitory computer readable medium of claim 42, wherein the instructions to display includes instructions to display the N CSFs in N guide thumbnail tiles wherein the selected one CSF is selected from a thumbnail tile associated with the selected one CSF.

44. The computer program product including a non-transitory computer readable medium of claim 40, wherein the instructions to decode further comprises instructions to buffer at least one CSF of a current channel, determine whether contents from the primary bitstream is corrupted in a video buffer, and to replace the contents of the video buffer with the at least one CSF of the current channel.

45. The computer program product including a non-transitory computer readable medium of claim 39, wherein the set of the plurality of CSFs is free of commercial content.

46. The computer program product including a non-transitory computer readable medium of claim 39, wherein the instructions to decode further comprises instructions to store at least one CSF for a next start point for a current channel and at least one CSF for a next start point for an adjacent channel to the current channel in the guide look ahead buffer.

47. A method comprising the steps of:
   decoding programming content of a set of plurality of channel switch frames (CSFs) from a common guide media logical channel (MLC) each respective active channel is associated with a respective one or more CSFs and has a different bitstream resolution than the respective one or more CSFs, wherein the MLC includes a separate CSF for direct entry to a stored channel, and wherein the stored channel comprises a broadcast program stored for future playback;
   displaying simultaneously on a display screen content of the decoded set of the plurality of CSFs; and
   acquiring and decoding a bitstream of the active channel associated with one of the set of the plurality of CSFs in response to a selection of the content of the decoded one of the set of the plurality of CSFs.

48. The method of claim 47, further comprising the step of automatically switching to a primary bitstream of an active channel associated with a selected one displayed CSF.

49. The method of claim 48, wherein the primary bitstream has a first resolution and the set of the plurality of CSFs has a second resolution, the first resolution is greater than the second resolution and the plurality of CSFs comprises N CSFs and wherein the decoding includes reducing the second resolution of a CSF by 1/N.

50. The method of claim 49, wherein the displaying includes displaying the N CSFs in N guide thumbnail tiles wherein the selected one CSF is selected from a thumbnail tile associated with the selected one CSF.

51. The method of claim 47, wherein the decoding comprises storing at least one CSF for a next start point for a current channel and at least one CSF for a next start point for an adjacent channel to the current channel in the guide look ahead buffer.

52. The method of claim 48, wherein the decoding further comprises buffering at least one CSF of a current channel, determining whether contents from the primary bitstream is corrupted in a video buffer, and replacing the contents of the video buffer with the at least one CSF of the current channel.

* * * * *